United States Patent
Gunnarsson et al.

(10) Patent No.: US 10,813,015 B2
(45) Date of Patent: Oct. 20, 2020

(54) METHOD FOR FLEXIBLY DEFINING A CELL BASED ON SETS OF SIGNALS

(71) Applicant: Telefonaktiebolaget LM Ericsson (publ), Stockholm (SE)

(72) Inventors: Fredrik Gunnarsson, Linköping (SE); Pradeepa Ramachandra, Linköping (SE); Kristina Zetterberg, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 324 days.

(21) Appl. No.: 15/746,070

(22) PCT Filed: Dec. 7, 2017

(86) PCT No.: PCT/SE2017/051230
§ 371 (c)(1),
(2) Date: Jan. 19, 2018

(87) PCT Pub. No.: WO2018/106175
PCT Pub. Date: Jun. 14, 2018

(65) Prior Publication Data
US 2020/0084678 A1    Mar. 12, 2020

Related U.S. Application Data

(60) Provisional application No. 62/432,406, filed on Dec. 9, 2016.

(51) Int. Cl.
*H04W 36/00*       (2009.01)
*H04L 5/00*        (2006.01)
(Continued)

(52) U.S. Cl.
CPC ..... *H04W 36/0083* (2013.01); *H04J 11/0069* (2013.01); *H04W 24/10* (2013.01)

(58) Field of Classification Search
CPC ............... H04W 36/0083; H04W 24/10; H04J 11/0069
See application file for complete search history.

(56) References Cited

U.S. PATENT DOCUMENTS

2016/0050004 A1* 2/2016 Mallik ................. H04L 1/0026
370/329
2016/0149681 A1* 5/2016 Vajapeyam ........... H04L 5/0048
370/252
(Continued)

FOREIGN PATENT DOCUMENTS

WO        2016138655 A1    9/2016

OTHER PUBLICATIONS

Unknown, Author, "Filtering of connected mode RSs", 3GPP TSG-RAN WG2 Meeting #96, R2-168729, Ericsson, Reno, Nevada, USA, Nov. 14-18, 2016, pp. 1-7.
(Continued)

*Primary Examiner* — Kiet Tang
(74) *Attorney, Agent, or Firm* — Murphy, Bilak & Homiller, PLLC

(57) ABSTRACT

A method (1100) in a wireless device (110) comprises obtaining (1104) a configuration for measurement management associated to cell definitions based on multiple signals, the configuration defining a first cell (125A) based on a first set of signals. The method comprises configuring (1108) measurement management associated to cell definitions based on multiple signals according to the obtained configuration. The method comprises performing (1112) one or more measurements on the first set of signals defining the first cell.

36 Claims, 20 Drawing Sheets

(51) Int. Cl.
  *H04L 1/00*    (2006.01)
  *H04W 72/04*   (2009.01)
  *H04J 11/00*   (2006.01)
  *H04W 24/10*   (2009.01)

(56) References Cited

U.S. PATENT DOCUMENTS

2017/0093544 A1\* 3/2017 Kazmi ..................... H04L 5/16
2019/0069314 A1\* 2/2019 Takeda ................. H04W 72/04

OTHER PUBLICATIONS

Unknown, Author, "NR Cell reselection for RRC_INACTIVE UEs", 3GPP TSG-RAN WG2 #96, Tdoc R2-168720, Ericsson, Reno, Nevada, USA, Nov. 14-18, 2016, pp. 1-3.

Unknown, Author, "RRC Measurement Reporting in NR", 3GPP TSG-RAN WG2 Meeting #96, Tdoc R2-168718, Ericsson, Reno, Nevada, USA, Nov. 14-18, 2016, pp. 1-4.

3GPP, "3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331 V14.0.0, Sep. 2016, 1-644.

\* cited by examiner

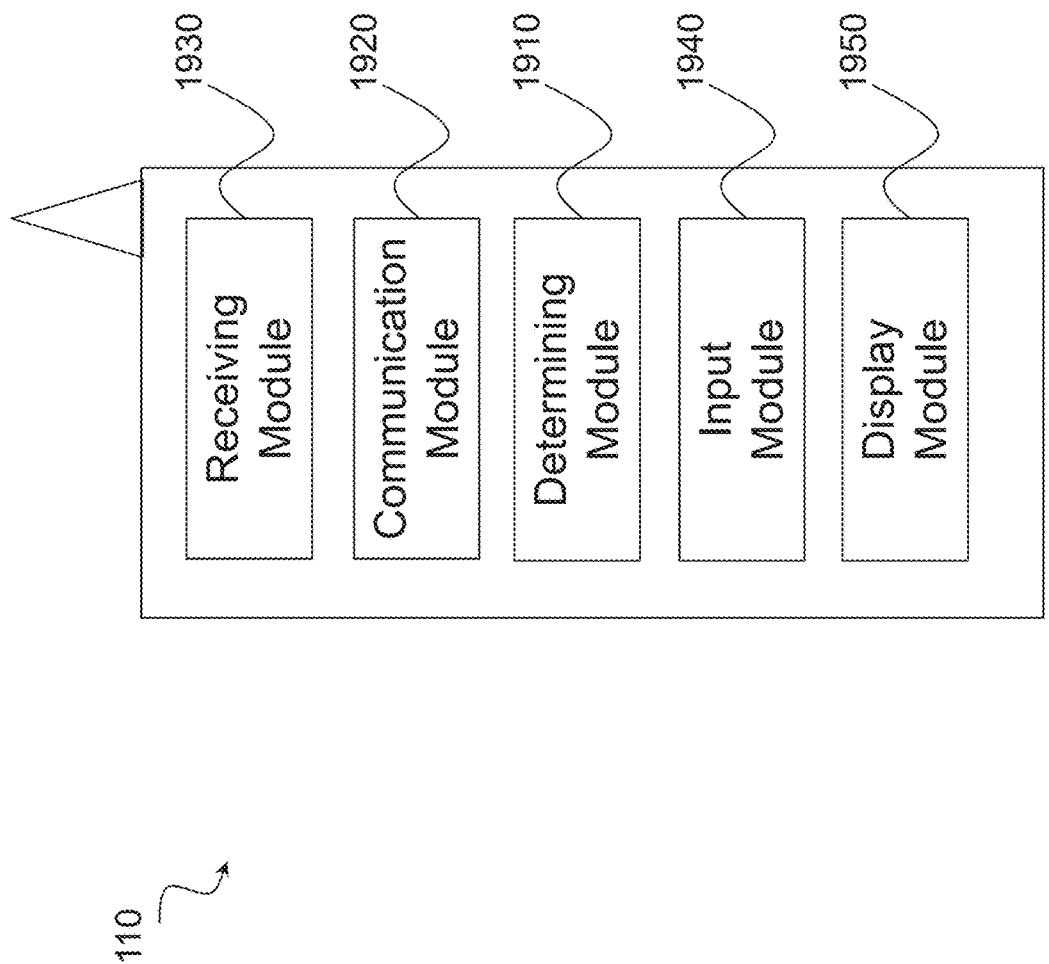

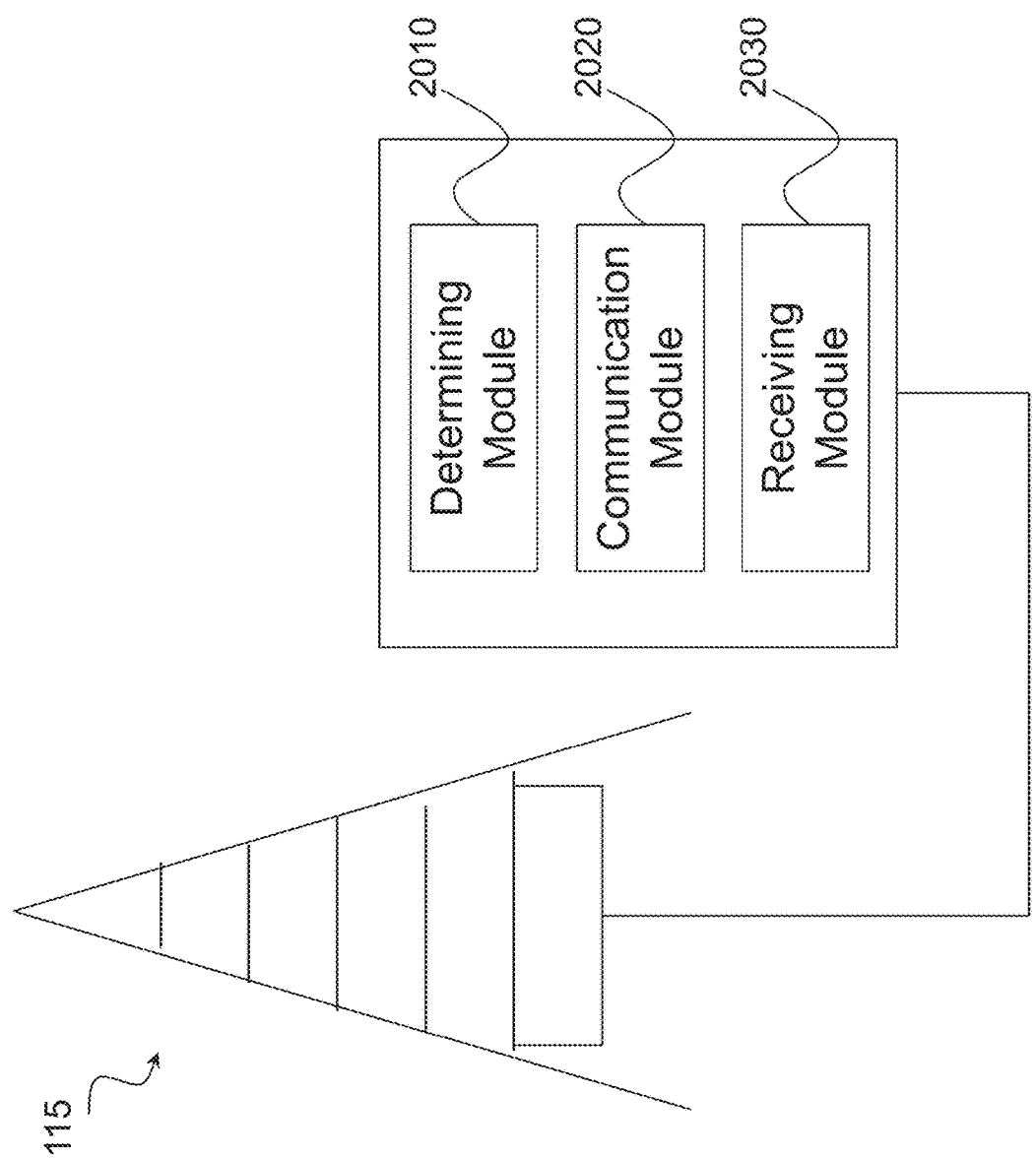

METHOD FOR FLEXIBLY DEFINING A CELL BASED ON SETS OF SIGNALS

TECHNICAL FIELD

The present disclosure relates, in general, to wireless communications and, more particularly, to flexibly defining a cell based on sets of signals.

BACKGROUND

In legacy networks, mobility between multiple network nodes (e.g., base stations) in a wireless access network is realized based on wireless device (e.g., user equipment (UE)) measurements on reference signals sent from the serving base station and neighboring base stations. Measurements reports can be sent to the serving base station periodically or based on measurement report triggering events.

For Long Term Evolution (LTE), the measurement report triggering events are specified in 3rd Generation Partnership Project (3GPP) Technical Specification (TS) 36.331 v14.0.0 (2016-09), "Technical Specification, 3rd Generation Partnership Project; Technical Specification Group Radio Access Network; Evolved Universal Terrestrial Radio Access (E-UTRA); Radio Resource Control (RRC); Protocol specification (Release 14)." The intra-Radio Access Technology (RAT) measurement report triggering events are based on measurements on serving (primary and secondary) and neighboring cells (events A1-A6), but also measurements on Channel State Information Reference Signals (CSI-RS) (Events C1-C2). The events are based on cell reference signal strength and/or quality (or, in the CSI-RS case, the CSI-RS strength and/or quality) becoming better and/or worse than one or more given threshold(s), or offset better than another cell (or CSI-RS resource). In LTE, the received signal strength is labeled Reference Signal Received Power (RSRP) (cell reference signal) and Channel State Information Reference Signal Received Power, CSI-RSRP (CSI-RS), and the signal quality is labeled Reference Signal Received Quality (RSRQ) or Reference signal-signal to noise and interference ratio, RS-SINR (cell reference signal), and similar for CSI-RS. Once the condition of a measurement report triggering event is fulfilled, the wireless device will send a measurement report to the serving base station, and a handover decision can be taken by the network.

Once the condition of a measurement report triggering event is fulfilled, the wireless device will send a measurement report to the serving base station, and a handover decision can be taken by the network. In some of the measurement report triggering events specified for LTE, a Cell Individual Offset (CIO) can be applied in the comparison of reference signal strength and/or quality from the serving and a neighboring cell. This has shown to be beneficial, as different handover conditions can be used towards different neighboring cells.

FIG. 1 illustrates an overview of idle mode cell selection and a downlink (DL)-based active mode mobility (AMM) solution proposed for 3GPP 5G New Radio (NR). In idle mode, a wireless device 110 will select a cell to camp on based on measurements of one or more sparsely transmitted signals (e.g., transmitted every 40 ms). For instance, in the example of FIG. 1 a first network node 115A transmits one or more sparsely transmitted signals within a first area 5, and a second network node 115B transmits one or more sparsely transmitted signals within a second area 10. In LTE, the sparsely transmitted signals were separated into a primary synchronization signal (PSS) and a secondary synchronization signal (SSS). The setup with a PSS/SSS for idle mode measurements can be considered also for NR. In some cases, the sparsely transmitted signals may be Mobility Reference Signals (MRSs).

To illustrate the proposed solution for DL-based AMM in NR, assume that wireless device 110 is served by first network node 115A, and that wireless device 110 is traveling in the direction of second network node 115B (as depicted by dashed arrow 15 in the example of FIG. 1). Wireless device 110 is requested to monitor MRSs associated to beams from serving and neighboring network nodes 115. For example, wireless device 110 is requested to monitor MRSs 20 transmitted by serving network node 115A (also referred to herein as "home MRSs") and MRSs 25 transmitted by neighboring network node 115B (also referred to herein as "away MRSs"). The MRSs can be grouped in sets like a home set (e.g., a grouping of MRSs 20 transmitted by serving network node 115A) and/or an away set (e.g., a grouping of MRSs 25 transmitted by neighboring network node 115B). The MRSs can be periodically or dynamically configured, and wireless device 110 can be configured to trigger reports and provide measurements with respect to these signals. Wireless device 110 uses the best "home beam" (i.e., a beam transmitted by network node 115A serving wireless device 110) 30 associated to a reference signal, for example the MRS, for coarse timing estimation, radio link quality monitoring (RLM) and failure detection. Best "home beam" 30 may be the MRS with the best received signal strength.

In addition, wireless device 110 monitors the sparsely transmitted signals from serving network node 115A in first area 5 (transmitted, for example, every 40 ms) and compares it with similar periodic and sparsely transmitted signals from potential target network nodes (e.g., sparsely transmitted signals (e.g., MRSs) from network node 115B in second area 10). When a target network node (e.g., network node 115B) becomes relevant for a more detailed handover procedure, additional dynamically configured home MRSs (e.g., dynamically configured MRSs transmitted by serving network node 115A) and dynamically configured away MRSs (e.g., dynamically configured MRSs transmitted by neighboring network node 115B) may be activated. The dynamically configured MRSs may be dynamically triggered.

The final handover decision is taken by the network. The decision is based on wireless device reports containing measurement(s) of home MRSs (i.e., MRSs 20 transmitted by serving network node 115A) and away MRSs (i.e., MRSs 25 transmitted by neighboring network node 115B).

FIG. 2 illustrates an example of handovers in active mode between different beams. More particularly, FIG. 2 illustrates per beam handovers of a wireless device 110 (e.g., a UE) between different nodes 115A, 115B, and 115C (a first, second, and third gNB, respectively, in the example of FIG. 2). Each network node 115A, 115B, and 115C transmits a plurality of beams. More particularly, network node 115A transmits beams 11, 12, and 13, network node 115B transmits beams 21, 22, and 23, and network node 115C transmits beams 31, 32, and 33. Assume that wireless device 110 is moving along arrow 205 through an area in the vicinity of network nodes 115A, 115B, and 115C. Taking handover decisions based on individual active mode MRS measurements only (i.e., always handing over to the beam with the highest active mode MRS strength and/or quality) would lead to six handovers when wireless device 110 is moving along arrow 205. The six handovers that would result are shown in Table 1 below.

TABLE 1

Example of handovers decisions based on individual active mode mobility reference signal measurements.

| Handover | — | 1a | 2a | 3a | 4a | 5a | 6a |
|---|---|---|---|---|---|---|---|
| New Serving gNB | 115A | 115B | 115A | 115A | 115C | 115C | 115C |
| New Serving Beam | 11 | 22 | 12 | 13 | 31 | 32 | 33 |

In some cases, there are problems associated with performing handover based on measurements of individual active mode MRSs. One situation in which handover based on individual active mode MRS measurements can be problematic is when the handover decision causes ping-pong between different nodes, as is the case in the example of FIG. 2. As can be seen from FIG. 2 and Table 1 above, three inter-network node handovers are made (namely handover 1a, 2a and 4a in Table 1 above). Whereas handover 4a is necessary as wireless device 110 continues moving between beams toward network node 115C (e.g., gNB3), the first two inter-network node handovers 1a and 2a result in a ping-pong between network nodes 115A and 115B. In this case, it would have been more beneficial to avoid handover 1a and stay in network node 115A (e.g., gNB1). Thus, in this example the granularity of the per-beam information used for the handover triggering is too high.

SUMMARY

To address the foregoing problems with existing solutions, disclosed is a method in a wireless device. The method comprises obtaining a configuration for measurement management associated to cell definitions based on multiple signals, the configuration defining a first cell based on a first set of signals. The method comprises configuring measurement management associated to cell definitions based on multiple signals according to the obtained configuration. The method comprises performing one or more measurements on the first set of signals defining the first cell.

In certain embodiments, the multiple signals may be associated to one or more of: a same time instant or a different time instant; a same frequency location or a different frequency location; a same antenna configuration or a different antenna configuration; a same node association or a different node association; a same code association or a different code association; a same sequence association or a different sequence association; and one or more synchronization signals.

In certain embodiments, the method may comprise evaluating one or more measurement report triggering conditions based on the one or more measurements performed on at least the first set of signals defining the first cell, and sending a measurement report to a network node when a measurement report triggering condition is met, the measurement report comprising information about the first cell.

In certain embodiments, the configuration may be part of a measurement object.

In certain embodiments, the first set of signals may be associated to a first search space where the first set of signals might be detected. In certain embodiments, the configuration may further define a second cell based on a second set of signals. The second set of signals may be associated to a second search space where the second set of signals might be detected, and the second search space may be different from the first search space. In certain embodiments, the first search space may comprise at least one of: a set of contiguous transmission resources; and multiple transmission resources in both time and frequency. In certain embodiments, the first search space may be associated to a first search space index, and the method may comprise receiving the first search space index associated to the first search space.

In certain embodiments, the method may comprise generating a measurement value for the first cell based on the one or more measurements performed on the first set of signals defining the first cell.

In certain embodiments, obtaining the configuration for measurement management associated to cell definitions based on multiple signals may comprise one of: receiving the configuration for measurement management associated to cell definitions based on multiple signals; and determining a pre-defined configuration for measurement management associated to cell definitions based on multiple signals.

In certain embodiments, the method may comprise receiving a request for capability information associated to cell definitions based on multiple signals, and sending capability information, the capability information indicating the capability of the wireless device for supporting measurement management associated to cell definitions based on multiple signals.

Also disclosed is a wireless device. The wireless device comprises a receiver, a transmitter, and processing circuitry coupled to the receiver and the transmitter. The processing circuitry is configured to obtain a configuration for measurement management associated to cell definitions based on multiple signals, the configuration defining a first cell based on a first set of signals. The processing circuitry is configured to configure measurement management associated to cell definitions based on multiple signals according to the obtained configuration. The processing circuitry is configured to perform one or more measurements on the first set of signals defining the first cell.

Also disclosed is a wireless device. The wireless device is operative to obtain a configuration for measurement management associated to cell definitions based on multiple signals, the configuration defining a first cell based on a first set of signals. The wireless device is operative to configure measurement management associated to cell definitions based on multiple signals according to the obtained configuration. The wireless device is operative to perform one or more measurements on the first set of signals defining the first cell.

Also disclosed is a method in a network node. The method comprises determining a configuration for measurement management associated to cell definitions based on multiple signals, the configuration defining a first cell based on a first set of signals. The method comprises sending information about the determined configuration to a wireless device. The method comprises receiving a measurement report from the wireless device, the measurement report comprising information about the first cell.

In certain embodiments, the multiple signals may be associated to one or more of: a same time instant or a different time instant; a same frequency location or a different frequency location; a same antenna configuration or a different antenna configuration; a same node association or a different node association; a same code association or a different code association; a same sequence association or a different sequence association; and one or more synchronization signals.

In certain embodiments, sending information about the determined configuration to the wireless device may comprise sending information about the determined configuration as part of a measurement object.

In certain embodiments, the first set of signals may be associated to a first search space where the first set of signals might be detected. In certain embodiments, the configuration may further define a second cell based on a second set of signals. The second set of signals may be associated to a second search space where the second set of signals might be detected, and the second search space may be different from the first search space. In certain embodiments, the first search space may comprise at least one of: a set of contiguous transmission resources; and multiple transmission resources in both time and frequency. In certain embodiments, the first search space may be associated to a first search space index, and the method may comprise sending, to the wireless device, the first search space index associated to the first search space.

In certain embodiments, the method may comprise sending a request for capability information associated to cell definitions based on multiple signals to the wireless device, and receiving the capability information from the wireless device.

In certain embodiments, sending information about the determined configuration to the wireless device may comprise sending the configuration for measurement management associated to cell definitions based on multiple signals to the wireless device.

In certain embodiments, the configuration for measurement management associated to cell definitions based on multiple signals may be predefined, and sending information about the determined configuration to the wireless device may comprise sending an indication of a predefined configuration to the wireless device.

In certain embodiments, the method may comprise evaluating handover decisions based on the received measurement report.

Also disclosed is a network node. The network node comprises a receiver, a transmitter, and processing circuitry coupled to the receiver and the transmitter. The processing circuitry is configured to determine a configuration for measurement management associated to cell definitions based on multiple signals, the configuration defining a first cell based on a first set of signals. The processing circuitry is configured to sending, via the transmitter, information about the determined configuration to a wireless device. The processing circuitry is configured to receive, via the receiver, a measurement report from the wireless device, the measurement report comprising information about the first cell.

Also disclosed is a network node. The network node is operative to determine a configuration for measurement management associated to cell definitions based on multiple signals, the configuration defining a first cell based on a first set of signals. The network node is operative to send information about the determined configuration to a wireless device. The network node is operative to receive a measurement report from the wireless device, the measurement report comprising information about the first cell.

Certain embodiments of the present disclosure may provide one or more technical advantages. For example, certain embodiments may advantageously enable a flexible cell definition that may vary over time, between devices, etc. As another example, certain embodiments may advantageously enable the use of signals associated to beams to jointly form cells for evaluation of measurements. As still another example, when the measurement report triggering is based on measurements of groups, or sets, of beams (represented by active mode MRSs) from the serving and neighboring network nodes (e.g., gNBs), the risk of problems caused by too high granularity (e.g., individual beam-based events) can be reduced. As yet another example, certain embodiments may advantageously enable flexibility, where different wireless devices (e.g., UEs) or wireless devices in different regions are configured differently. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which:

FIG. 19 is a block schematic of an exemplary wireless device, in accordance with certain embodiments; and FIG. 20 is a block schematic of an exemplary network node, in accordance with certain embodiments.

DETAILED DESCRIPTION

In a beam-based system, the processing at the wireless device side increases (especially when the number of beams per network node increases). It is also possible that the amount of signaling increases as well, since there can be multiple transitions from one home beam to a different beam that need to be reflected in the signaling. If per-beam measurements are unfiltered, then the number of reports is also high due to the fluctuations of the signal strength. In some cases, this is handled by filtering to lessen the impact of these variations. Given the large number of possible beams, however, a per-beam filter will increase the processing at the wireless device significantly.

In NR, the possibility of using beam-formed active mode MRSs will bring advantages in terms of directing a wireless device to the correct beam upon handover. The possibility of using beam-formed active mode MRSs, however, also creates challenges with respect to wireless device measurement and reporting. One possible approach to these challenges is that the measurement report triggering events used in legacy networks (e.g., events A1-A6 and/or C1-C2 events defined in E-UTRA) could be extended to use the beam-formed active mode MRSs, and handover decisions could be taken based on individual beams.

Figure 2:
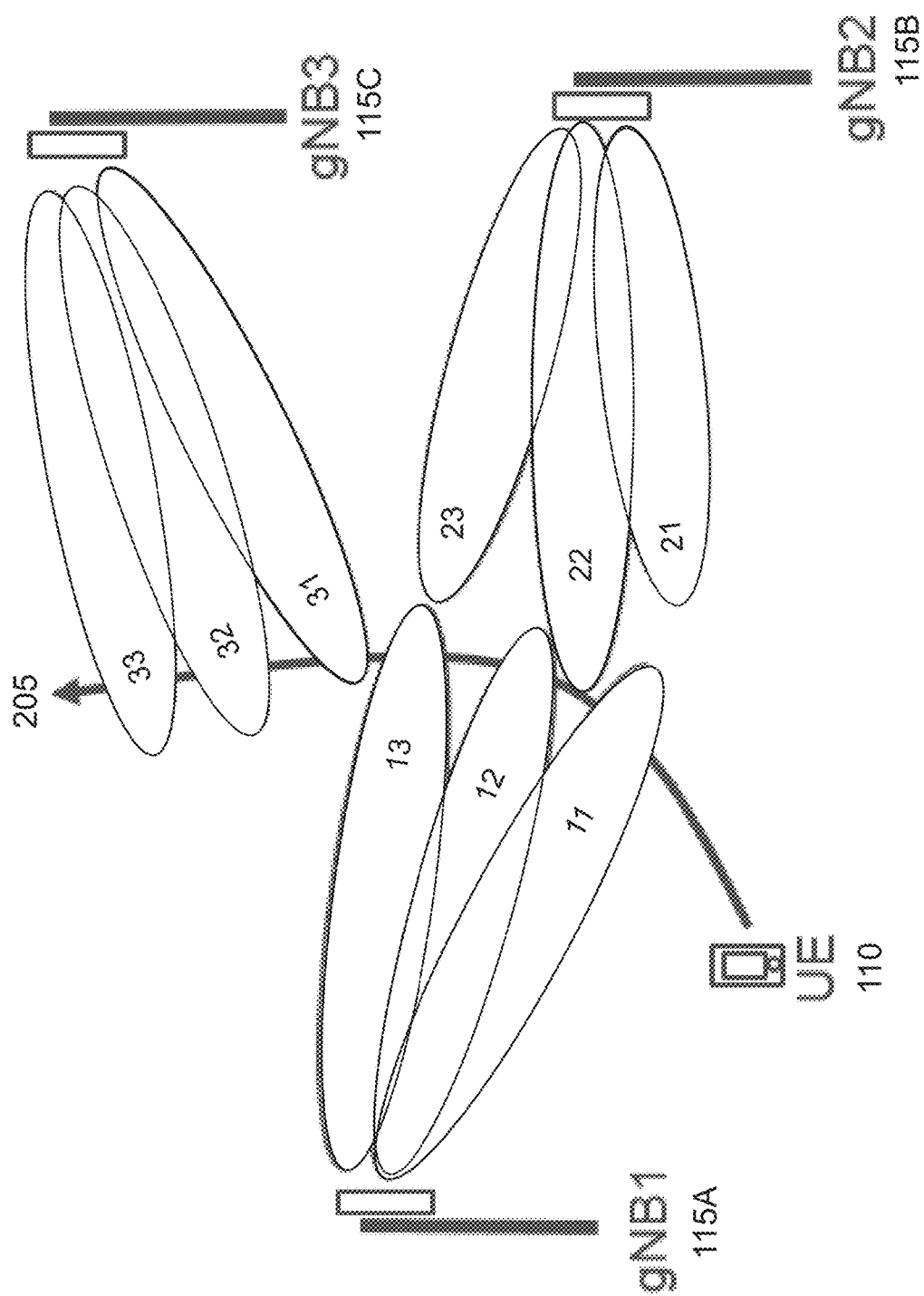
FIG. 2 illustrates an example of handovers in active mode between different beams.

Active Mode Mobility (AMM) can, for example, be supported by measurements on synchronization signals transmitted via wide beams of beam reference signals via narrow beams. As described above, however, there can be situations where performing handover based on measurements of individual active mode MRSs may not be the most beneficial choice. One situation when handover based on individual active mode MRS measurements can be problematic is when the handover decisions cause ping-pong between different network nodes, such as in the scenario described above in relation to FIG. 2 where the wireless device is handed over between adjacent nodes. In such a case, unnecessary handovers can result between network nodes due to the use of per-beam information that has too high a granularity.

The present disclosure contemplates various embodiments that may address these and other deficiencies associated with existing approaches in narrow beam-based systems. In certain embodiments, a wireless device (e.g., a UE) is configured with measurement management associated to cell definitions based on multiple signals, enabling the wireless device to combine measurements of several beams into per cell measurements that can be used in triggering conditions. The signals can be sent in dedicated search spaces, which the wireless device is configured to monitor. Moreover, the wireless device can report identifiers of best beams, search spaces where a cell was detected, etc.

A cell in this context is defined as a combination of downlink (DL) and optionally uplink (UL) resources. The linking between the carrier frequency of the DL resources and the carrier frequency of the UL resources may be indicated in the system information transmitted on the DL resources. The DL resources are traditionally represented by a synchronization signal such as PSS/SSS, associated to a physical cell identifier. However, as is described herein, the DL resource can also comprise multiple signals. In certain embodiments, flexible cell definitions for measurement management are achieved by combining signal measurements in configurations and reports to realize cells. Given the sparsely transmitted signals and the signals associated to beams, certain embodiments provide a definition of a cell as part of a measurement object. In certain embodiments, these signals will be configured in search spaces, and therefore, the cell in the measurement object can be defined also based on search space information. Given a cell definition, the measurement reports can be based on blindly decoded identifiers or identifiers being part of a set that is associated to a cell.

In certain embodiments, a wireless device (such as a UE) may indicate its capability of supporting measurement management associated to cell definitions based on multiple signals. The network node (e.g., base station) may check the wireless device capability of supporting measurement management associated to cell definitions based on multiple signals. For capable wireless devices, the network node may provide measurement management associated to cell definitions based on multiple signals. The wireless device may be configured by a serving network node for measurement management associated to cell definitions based on multiple signals. The cell definition can be traditional with a frequency carrier where cells are blindly detected based on PSS/SSS or where cells are listed as physical cell identifiers. However, the cell definition can also be based on multiple signals. For example, the cell definition can be based on one or more of a set of reference signals with or without a self-contained synch component and a search space in frequency and optionally also in time.

The cell definition also enables determination of a single measurement value representing the cell. In certain embodiments, the wireless device configures measurements of signals and measurement management to enable generation of measurements representing cells. Based on the measurements representing cells, the wireless device can trigger measurement reports, based on filtering of measurements and triggering conditions. In the reports, the wireless device may include measurements associated to cells, but also to the individual signals and search spaces. The network node receives a measurement report from a wireless device when a measurement report triggering condition has been met.

According to one example embodiment, a method in a wireless device (e.g., UE) is disclosed. The wireless device obtains a configuration for measurement management associated to cell definitions based on multiple signals. The configuration may define a first cell based on a first set of signals. In certain embodiments, the wireless device may send capability information, the capability information indicating the capability of the wireless device for supporting measurement management associated to cell definitions based on multiple signals. In some cases, the wireless device may provide the capability information in response to receiving a request for capability information associated to cell definitions based on multiple signals (e.g., from a network node).

The wireless device configures measurement management associated to cell definitions based on multiple signals according to the obtained configuration. The wireless device performs one or more measurements on the first set of signals defining the first cell. In certain embodiments, the wireless device may evaluate one or more measurement report triggering conditions based on the one or more measurements performed on at least the first set of signals defining the first cell. The wireless device may provide information about the first cell. For example, the wireless device may send a measurement report to a network node when a measurement report triggering condition is met. The measurement report may comprise information about the first cell.

According to another example embodiment, a method in a network node is disclosed. The network node determines a configuration for measurement management associated to cell definitions based on multiple signals. The configuration may define a first cell based on a first set of signals. In certain embodiments, the network node may receive capability information from the wireless device. The capability information may indicate the capability of the wireless device for supporting measurement management associated to cell definitions based on multiple signals. As one example, the network node may send a request for capability information associated to cell definitions based on multiple signals to the wireless device, and receive the capability information in response to the request. The network node sends information about the determined configuration to the wireless device. The network node receives a measurement report from the wireless device. The measurement report may include information about the first cell.

Certain embodiments of the present disclosure may provide one or more technical advantages. For example, certain embodiments may advantageously enable a flexible cell definition that may vary over time, between devices, etc. As another example, certain embodiments may advantageously enable the use of signals associated to beams to jointly form cells for evaluation of measurements. As still another example, when the measurement report triggering is based on measurements of groups, or sets, of beams (represented by active mode MRSs) from the serving and neighboring network nodes (e.g., gNBs), the risk of problems caused by too high granularity (e.g., individual beam-based events) can be reduced. As yet another example, certain embodiments may advantageously enable flexibility, where different individuals or individuals in different regions are configured differently. Other advantages may be readily apparent to one having skill in the art. Certain embodiments may have none, some, or all of the recited advantages.

Figure 3:
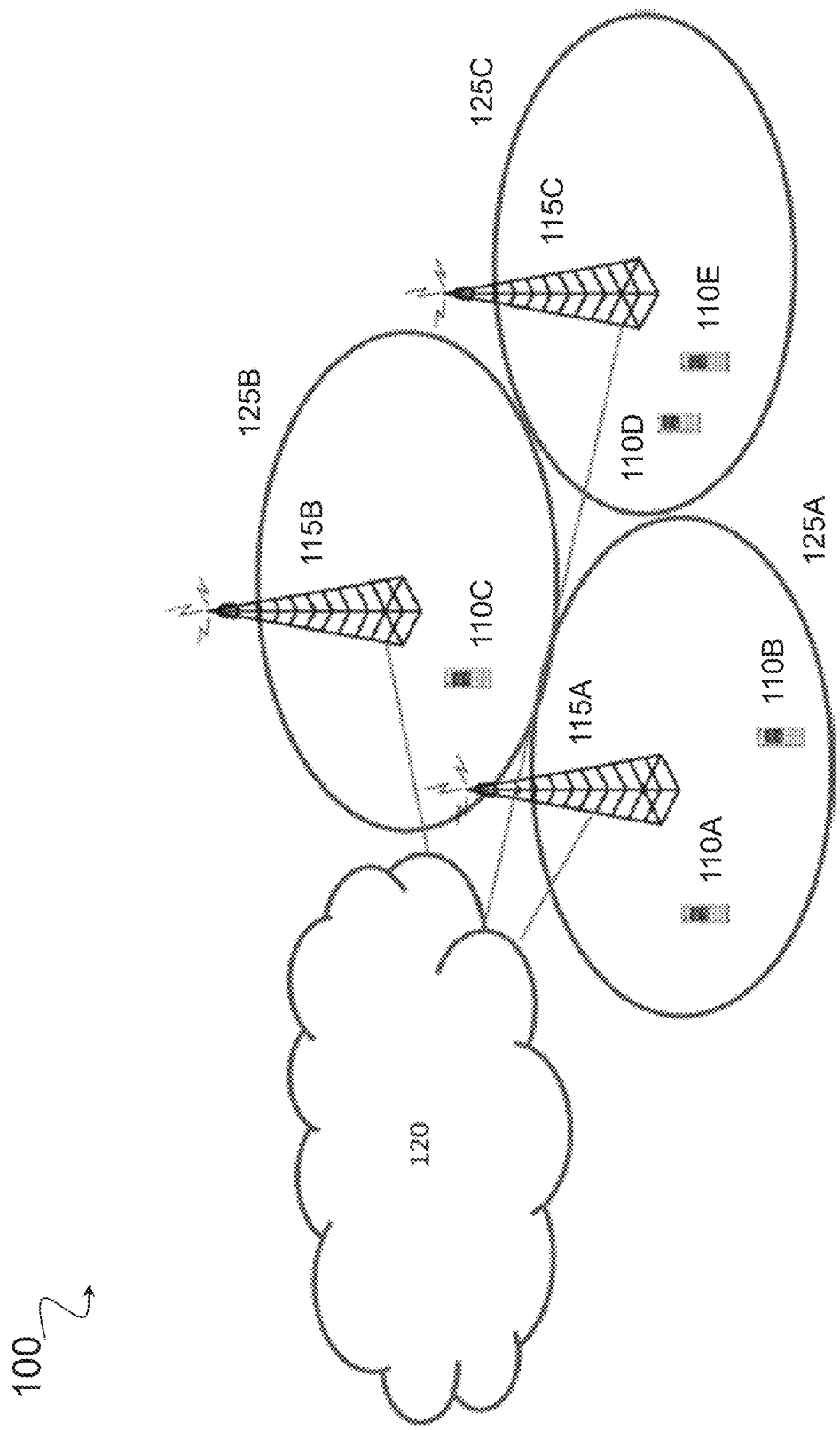
FIG. 3 is a block diagram illustrating an embodiment of a wireless communications network, in accordance with certain embodiments.

FIG. 3 is a block diagram illustrating an embodiment of a network 100, in accordance with certain embodiments. Network 100 includes a plurality wireless devices 110 (e.g., wireless device 110A-E in the example of FIG. 3) and one or more network node(s) 115 (e.g., network nodes 115A-C in the example of FIG. 3). Wireless devices 110 may communicate with network nodes 115 over a wireless interface. For example, a wireless device 110 may transmit wireless signals to one or more of network nodes 115, and/or receive wireless signals from one or more of network nodes 115. The wireless signals may contain voice traffic, data traffic, control signals, and/or any other suitable information. In some embodiments, an area of wireless signal coverage associated with a network node 115 may be referred to as a cell 125. For example, in FIG. 3 an area of wireless signal coverage associated with network node 115A is cell 125A, an area of wireless signal coverage associated with network node 115B is cell 125B, and an area of wireless signal coverage associated with network node 115C is cell 125C. In some embodiments, wireless devices 110 may have device-to-device (D2D) capability. Thus, wireless devices 110 may be able to receive signals from and/or transmit signals directly to another wireless device. In certain embodiments, network nodes 115 may transmit one or more beams, and one or more wireless devices 110 may be configured to monitor the beams from one or more of network nodes 115.

In certain embodiments, network nodes 115 may interface with a radio network controller. The radio network controller may control network nodes 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network 120. Interconnecting network 120 may refer to any interconnecting system capable of transmitting audio, video, signals, data, messages, or any combination of the preceding. Interconnecting network 120 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for wireless devices 110. Wireless devices 110 may exchange certain signals with the core network node using the non-access stratum layer. In non-access stratum signaling, signals between wireless devices 110 and the core network node may be transparently passed through the radio access network. In certain embodiments, network nodes 115 may interface with one or more network nodes over an internode interface, such as, for example, X2 and S1 interfaces.

As described above, example embodiments of network 100 may include one or more wireless devices 110, and one or more different types of network nodes capable of communicating (directly or indirectly) with wireless devices 110.

In some embodiments, the non-limiting term wireless device is used. Wireless devices 110 described herein can be any type of wireless device capable, configured, arranged and/or operable to communicate wirelessly with network nodes 115 and/or another wireless device. Communicating wirelessly may involve transmitting and/or receiving wireless signals using electromagnetic signals, radio waves, infrared signals, and/or other types of signals suitable for conveying information through air. In particular embodiments, wireless devices 110 may be configured to transmit and/or receive information without direct human interaction. For instance, a wireless device 110 may be designed to transmit information to a network on a predetermined schedule, when triggered by an internal or external event, or in response to requests from the network. Generally, a wireless device 110 may represent any device capable of, configured for, arranged for, and/or operable for wireless communication, for example radio communication devices. Examples of wireless devices 110 include, but are not limited to, UEs such as smart phones. Further examples include wireless cameras, wireless-enabled tablet computers, mobile terminals, laptop-embedded equipment (LEE), laptop-mounted equipment (LME), USB dongles, and/or wireless customer-premises equipment (CPE). Wireless device 110 may also be a radio communication device, target device, D2D UE, machine-type-communication (MTC) UE or UE capable of machine-to-machine (M2M) communication, low-cost and/or low-complexity UE, a sensor equipped with UE, or any other suitable devices. Wireless devices 110 may operate under either normal coverage or enhanced coverage with respect to its serving cell. The enhanced coverage may be interchangeably referred to as extended coverage. Wireless devices 110 may also operate in a plurality of coverage levels (e.g., normal coverage, enhanced coverage level 1, enhanced coverage level 2, enhanced coverage level 3 and so on). In some cases, wireless devices 110 may also operate in out-of-coverage scenarios.

As one specific example, wireless device 110 may represent a UE configured for communication in accordance with one or more communication standards promulgated by 3GPP, such as 3GPP's GSM, UMTS, LTE, and/or 5G standards. As used herein, a "UE" may not necessarily have a "user" in the sense of a human user who owns and/or operates the relevant device. Instead, a UE may represent a device that is intended for sale to, or operation by, a human user but that may not initially be associated with a specific human user.

Wireless devices 110 may support D2D communication, for example by implementing a 3GPP standard for sidelink communication, and may in this case be referred to as a D2D communication device.

As yet another specific example, in an Internet of Things (IOT) scenario, a wireless device 110 may represent a machine or other device that performs monitoring and/or measurements, and transmits the results of such monitoring and/or measurements to another wireless device and/or a network node. Wireless device 110 may in this case be a M2M device, which may in a 3GPP context be referred to as a MTC device. As one particular example, a wireless device 110 may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, personal wearables such as watches, etc.). In other scenarios, a wireless device 110 may represent a vehicle or other equipment that is capable of monitoring and/or reporting on its operational status or other functions associated with its operation.

Wireless device 110 as described above may represent the endpoint of a wireless connection, in which case the device may be referred to as a wireless terminal. Furthermore, a wireless device 110 as described above may be mobile, in which case it may also be referred to as a mobile device or a mobile terminal.

Also, in some embodiments generic terminology, "network node" is used. As used herein, "network node" refers to equipment capable, configured, arranged and/or operable to communicate directly or indirectly with a wireless device and/or with other equipment in the wireless communication network that enable and/or provide wireless access to the wireless device. Examples of network nodes include, but are not limited to, access points (APs), in particular radio APs. A network node may represent base stations (BSs), such as radio base stations. Particular examples of radio base stations include Node Bs, evolved Node Bs (eNBs), and gNBs. Base stations may be categorized based on the amount of coverage they provide (or, stated differently, their transmit power level) and may then also be referred to as femto base stations, pico base stations, micro base stations, or macro base stations. "Network node" also includes one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base stations may also be referred to as nodes in a distributed antenna system (DAS).

As a particular non-limiting example, a base station may be a relay node or a relay donor node controlling a relay.

Yet further examples of network nodes include multi-standard radio (MSR) radio equipment such as MSR BSs, network controllers such as radio network controllers (RNCs) or base station controllers (BSCs), base transceiver stations (BTSs), transmission points, transmission nodes, Multi-cell/multicast Coordination Entities (MCEs), core network nodes (e.g., Mobile Switching Centers (MSCs), Mobility Management Entities (MMEs), etc.), Operation and Maintenance (O&M) nodes, Operations Support System (OSS) nodes, Self-Organizing Network (SON) nodes, positioning nodes (e.g., Evolved Serving Mobile Location Center (E-SMLCs)), minimization of drive tests (MDTs), or any other suitable network node. More generally, however, network nodes may represent any suitable device (or group of devices) capable, configured, arranged, and/or operable to enable and/or provide a wireless device access to the wireless communication network or to provide some service to a wireless device that has accessed the wireless communication network.

The terminology such as network node and wireless device should be considered non-limiting and does in particular not imply a certain hierarchical relation between the two; in general "network node" could be considered as device 1 and "wireless device" device 2, and these two devices communicate with each other, for example over some radio channel.

Example embodiments of wireless device 110, network nodes 115, and other network nodes (such as radio network controller or core network node) are described in more detail below with respect to FIGS. 13-20.

Although FIG. 3 illustrates a particular arrangement of network 100, the present disclosure contemplates that the various embodiments described herein may be applied to a variety of networks having any suitable configuration. For example, network 100 may include any suitable number of wireless devices 110 and network nodes 115, as well as any additional elements suitable to support communication between wireless devices or between a wireless device and another communication device (such as a landline telephone). Furthermore, although certain embodiments may be described as implemented in an NR network, the embodiments may be implemented in any appropriate type of telecommunication system supporting any suitable communication standards (including 5G standards) and using any suitable components, and are applicable to any radio access technology (RAT) or multi-RAT systems in which a wireless device receives and/or transmits signals (e.g., data). For example, the various embodiments described herein may be applicable to LTE, LTE-Advanced, LTE in Unlicensed Spectrum (LTE-U), MulteFire, NR, 5G, IoT, NB-IoT, UMTS, HSPA, GSM, cdma2000, WCDMA, WiMax, UMB, WiFi, another suitable radio access technology, or any suitable combination of one or more radio access technologies. Although the design of measurement triggering for groups of reference signals may be described herein using DL as examples, the present disclosure is not limited to these examples. Rather, the present disclosure contemplates that the various embodiments described herein may be applied to other systems as well as UL or sidelinks.

As described above, the present disclosure contemplates various embodiments that may address certain deficiencies associated with existing approaches in narrow beam-based systems. In certain embodiments, a wireless device 110, such as wireless device 110B, is configured by its serving network node (e.g., network node 115A) with measurement management associated to cell definitions based on multiple signals, enabling wireless device 110B to combine measurements of several beams into per cell measurements that can be used in triggering conditions. As described in more detail below, the cell definition can be traditional with a frequency carrier where cells are blindly detected based on PSS/SSS or where cells are listed as physical cell identifiers. However, the cell definition can also be based on multiple signals. For example, the cell definition can be based on one or more of a set of reference signals with or without a self-contained synchronization component and a search space in frequency and optionally also in time. The signals can be sent in dedicated search spaces, which wireless device 110B is configured to monitor. Moreover, wireless device 110B can report identifiers of best beams, search spaces where a cell was detected, as well as other suitable information. The description below addresses the situation when network nodes 115 are transmitting one or more beams, and wireless devices 110 may be asked to monitor these beams from one or more nodes.

As described in more detail below, the cell definition also enables determination of a single measurement value representing the cell. In certain embodiments, wireless device 110B configures measurements of signals and measurement management to enable generation of measurements representing cells. Based on the measurements representing cells, wireless device 110B can trigger measurement reports, based on filtering of measurements and triggering conditions. In the reports, wireless device 110B may include measurements associated to cells, but also to the individual signals and search spaces. Network node 115A receives a measurement report from wireless device 110B when a measurement report triggering condition has been met.

In certain embodiments, a network node 115, such as network node 115A, determines a configuration for measurement management associated to cell definitions based on multiple signals. The determined configuration may define at least a first cell (e.g., cell 125A) based on a first set of signals. In certain embodiments, the configuration may further define one or more additional cells based on additional sets of signals, such as a second cell (e.g., cell 125B) based on a second set of signals. In certain embodiments, the multiple signals may be associated to one or more of: a same time instant or a different time instant; a same frequency location or a different frequency location; a same antenna configuration or a different antenna configuration; a same node association or a different node association; a same code association or a different code association; a same sequence association or a different sequence association; and one or more synchronization signals.

As described above, a cell in this context is defined as a combination of DL and optionally UL resources. The linking between the carrier frequency of the DL resources and the carrier frequency of the UL resources may be indicated in the system information transmitted on the DL resources. The DL resources are traditionally represented by a synchronization signal (such as PSS/SSS), associated to a physical cell identifier. However, as is described herein, the DL resource can also comprise multiple signals. In certain embodiments, flexible cell definitions for measurement management are achieved by combining signal measurements in configurations and reports to realize cells.

In certain embodiments, the first set of signals may be a beam group. As described in more detail below, a beam group may be formed in a variety of ways. For example, in certain embodiments the beam group may be formed as one or more of: a set of reference signals independent of transmission resources; a set of transmission resources independent of reference signals; a combined set of reference signals and transmission resources; a group of beams sharing the same transmitted cell identifier, a group of beams sharing the same node identifier; and a group of beams sharing the same transmission/reception point.

In certain embodiments, the first cell may be defined via one or more of: a primary synchronization sequence and a secondary synchronization sequence; a signal in a specified search space; a signal from the first set of signals; and a signal from the first set of signals in a search space. For example, in certain embodiments, the first set of signals may be associated to a first search space where the first set of signals might be detected. As noted above, in certain embodiments the configuration may further define a second cell (e.g., cell 125B) based on a second set of signals. In such a scenario, the second set of signals may be associated to a second search space where the second set of signals might be detected. The second set of signals may be different from the first search space.

In certain embodiments, the search spaces may comprise multiple transmission resources in both time and frequency. A frequency resource of each search space may be defined in any suitable manner. For example, in certain embodiments the frequency resource of a search space may be defined in absolute terms, such as via an Absolute Radio Frequency Carrier Number (ARFCN). As another example, a frequency resource of a search space may be defined in relative terms (e.g., as a frequency offset with respect to a carrier frequency). As another example, the search spaces may be defined in times relative the time of a separate synchronization signal, such as the PSS/SSS. These possibilities are described in more detail below in relation to FIGS. 7-9.

In certain embodiments, the one or more of the search spaces may comprise a set of contiguous transmission resources (as described in more detail below in relation to FIGS. 7-9). In certain embodiments, each search space (or a set of search spaces) may be associated to a search space index. When defining multiple search spaces, the search space index is an identifier of each search space that can be used to identify a search space in the cell definition as well as in the measurement report.

Network node 115A sends information about the determined configuration to a wireless device 110, such as wireless device 110B. Network node 115A may send the information about the determined configuration to wireless device 110B in any suitable manner. For example, in certain embodiments network node 115A may send information about the determined configuration to wireless device 101B by sending the configuration for measurement management associated to cell definitions based on multiple signals to the wireless device. As another example, in certain embodiments the configuration for measurement management associated to cell definitions based on multiple signals may be predefined, and network node 115A may send information about the determined configuration to wireless device 110B by sending an indication of the predefined configuration to the wireless device. For example, network node 115A may send a first search space index associated to the first search space (and perhaps one or more additional search space indices, such as a second search space index associated to the second search space) to wireless device 110.

Wireless device 110B obtains the configuration for measurement management associated to cell definitions based on multiple signals. As noted above, the configuration defines at least the first cell 125A based on a first set of signals (and perhaps additional cells based on other sets of signals, such as second cell (e.g., cell 125B) based on a second set of signals. Wireless device 110B may obtain the configuration in any suitable manner. For example, in certain embodiments wireless device 110B may obtain the configuration by receiving the configuration for measurement management associated to cell definitions based on multiple signals. As another example, in certain embodiments wireless device 110B may obtain the configuration by determining a predefined configuration for measurement management associated to cell definitions based on multiple signals. In some cases, wireless device 110B may receive the first search space index associated to the first search space, and determine the pre-defined configuration based on the received first search space index.

Wireless device 110B configures measurement management associated to cell definitions based on multiple signals according to the obtained configuration. Wireless device 110B performs one or more measurements on the first set of signals defining the first cell. In certain embodiments, wireless device 110B may generate a measurement value for the first cell based on the one or more measurements performed on at least the first set of signals defining the first cell. In certain embodiments, each of the one or more measurements performed on the first set of signals defining the first cell may be a per-beam measurement, and wireless device 110B may generate the measurement value for the first cell by combining a plurality of per-beam measurements into a per-cell measurement for the first cell. The generation of measurement values by a wireless device 110 is described in more detail below in relation to FIG. 4.

In certain embodiments, wireless device 110B evaluates one or more measurement report triggering conditions based on the one or more measurements performed on the first set of signals defining first cell 125A. Wireless device 110B may send a measurement report to network node 115A (or another network node 115) when a measurement report triggering condition is met. The measurement report may comprise information about first cell 125A. The information about first cell 125A may include any suitable type of information. For example, in certain embodiments the information about the first cell may include one or more of: information about a best beam; information about a cell defined via the set of signals; information about an associated cell individual offset; and information about one or more search spaces. The evaluation of measurement report triggering and sending of a measurement report by a wireless device 110 is described in more detail below in relation to FIG. 4.

Network node 115A receives the measurement report from wireless device 110, including any information about first cell 125A that may be included in the measurement report. In certain embodiments, network node 115A may evaluate handover decisions based on the received measurement report.

In certain embodiments, network node 115A may obtain capability information for wireless device 110B. The capability information may indicate the capability of wireless device 110B for supporting measurement management associated to cell definitions based on multiple signals. Network node 115A may obtain the capability information for wireless device 110B in any suitable manner. As one example, network node 115A may autonomously determine the capability information. As another example, network node 115A may receive the capability information from wireless device 110B or another network node 115. In some cases, network node 115A may send a request for capability information associated to cell definitions based on multiple signals to wireless device 110B. Wireless device 110B may receive the request for capability information associated to cell definitions based on multiple signals, and send capability information to network node 115 in response to the request. In some cases, wireless device 110B may send capability information to network node 115A (or another network node 115) without receiving an explicit request for the capability information.

Network node 115A may check the capability of wireless device 110B for supporting measurement management associated to cell definitions based on multiple signals. If wireless device 110B is capable of supporting measurement management associated to cell definitions based on multiple signals, network node 115A may configure wireless device 110B for measurement management associated to cell definitions based on multiple signals as described above.

Figure 4:
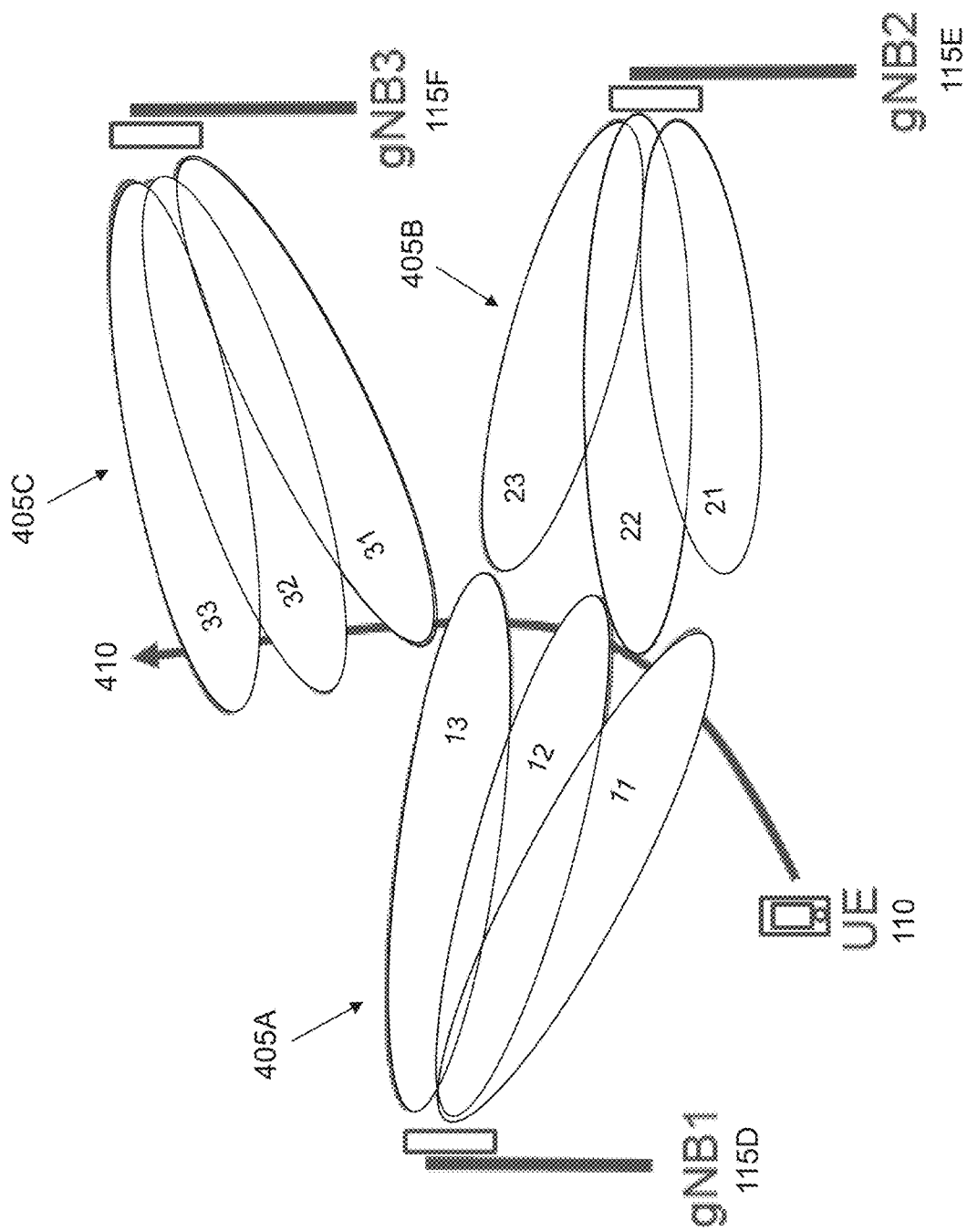
FIG. 4 illustrates an example of multiple beams from multiple nodes or gNBs, in accordance with certain embodiments.

FIG. 4 illustrates an example of multiple beams from multiple nodes or gNBs, in accordance with certain embodiments. Similar to FIG. 2 above, FIG. 4 illustrates an example with three network nodes 115D (e.g., gNB1), 115E (e.g., gNB2), and 115F (e.g., gNB3). Each network node 115 transmits a plurality of beams. In the example of FIG. 4, network node 115D transmits beams 11, 12, and 13, network node 115E transmits beams 21, 22, and 23, and network node 115F transmits beams 31, 32, 33. Although FIG. 4 illustrates three beams transmitted by each of network nodes 115D, 115E and 115F, this is for purposes of example only. The present disclosure contemplates that network nodes 115 may transmit more or fewer beams than illustrated in the example of FIG. 4.

In the example of FIG. 4, beams 11, 12, and 13 transmitted by network node 115D (gNB1) are considered to be in a first group (Group 1 405A), beams 21, 22, and 23 transmitted by network node 115E (gNB2) are considered to be in a second group (Group 2 405B), and beams 31, 32, and 33 transmitted by network node 115F (gNB3) are considered to be in a third group (Group 3 405C). Although FIG. 4 illustrates particular configurations of beam Group 1 405A, beam Group 2 405B, and beam Group 3 405C, the beam group configurations illustrated in FIG. 4 are for purposes of example only, and the present disclosure is not limited to such examples. Rather, the present disclosure contemplates that any suitable beam group configurations may be used, and the number of beams in each beam group may be different from that illustrated in the example of FIG. 4. For example, network nodes 115D, 115E, and 115F may transmit one or more other beams in addition to those illustrated in the example of FIG. 4. A beam group 405 may include all or less than all of the beams transmitted by a given network node 115. For example, in some cases a particular beam transmitted by a given network node 115 may not be included in a beam group because it may be the case that wireless devices do not often travel along a path that includes that particular beam. The likelihood of a wireless device to pass through a particular beam may be determined in any suitable manner (e.g., based on historical data for one or more wireless devices). Furthermore, in certain embodiments a beam group 405 may include beams from more than one network node (e.g., network nodes 115A and 115B).

In the example of FIG. 4, assume that wireless device 110 is moving along arrow 410 through an area in the vicinity of network nodes 115D, 115E, and 115F. Wireless device 110 (e.g., a UE) may be configured to monitor one or more of the beams from one or more of network nodes 15D, 115E, and 115F. Initially, in the example of FIG. 4, wireless device 110 is served by network node 115D. Each beam ij (node i, beam j at node i) is associated to a reference signal (e.g., a beam reference signal, $BRS_{ij}$) and a transmission resource $TR_{ij}^{(k)}$ for transmission k, where a transmission resource can be allocated in time and/or frequency.

Figure 1:
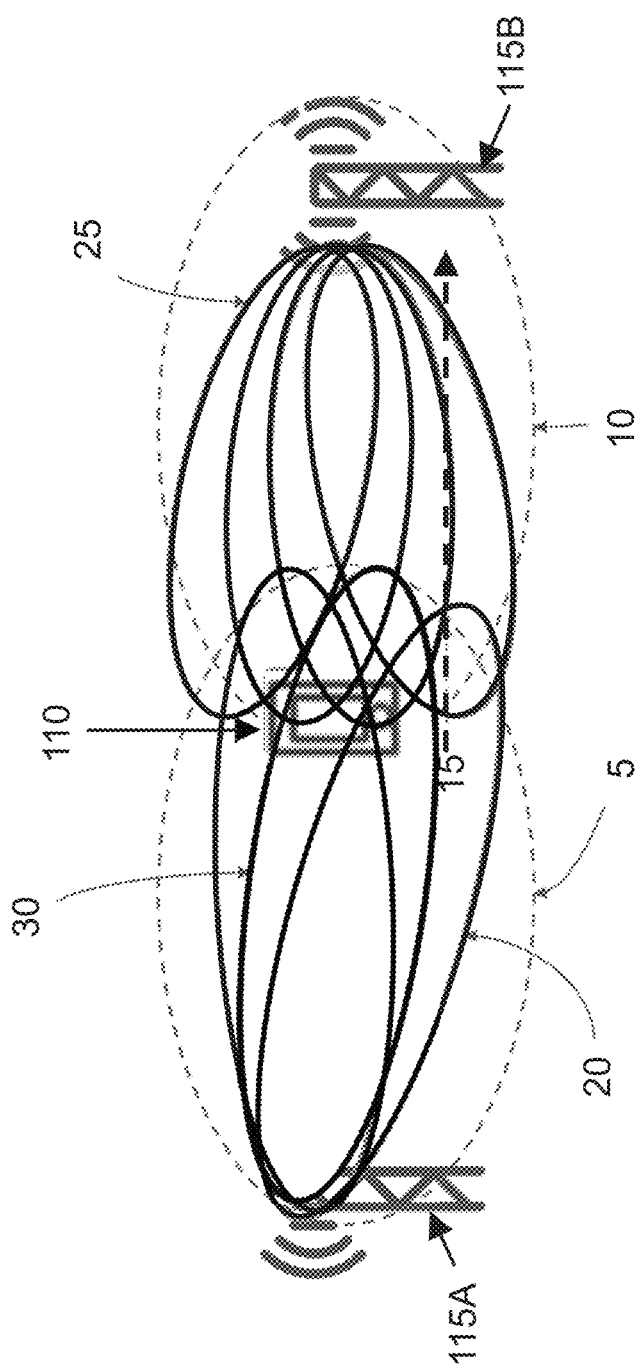
FIG. 1 illustrates an overview of idle mode cell selection and a DL-based AMM solution proposed for 3GPP 5G NR.

Herein, beam reference signal is used as a generic name of a signal that can be associated to beams. Optionally, the beam reference signal can be embedded with a synchronization component, in which case the signal may be referred to as a MRS. Examples of MRSs include, for example, Synchronization Signal (SS)/Physical Broadcast Channel (PBCH) blocks. In some cases, one or more SS/PBCH blocks may be used as sparse periodic MRSs, such as the sparse periodic MRS described above in relation to FIG. 1. In some cases, one or more CSI-RS can be used as dynamically configured MRS, such as the dynamically configured home MRS and/or dynamically configured away MRS described above in relation to FIG. 1. In case the beam reference signal is referring to a separate synchronization signal (such as PSS/SSS), the typical example is a CSI-RS. Hence, in two different embodiments, the BRS can be realized with one of: a synchronization component, and the signal will be referred to as a MRS; and referring to a separate synchronization signal.

The BRS may be configured in any suitable manner. In some cases, the BRSs may be configured to be locally unique so that wireless device 110 only detects unique BRSs. In some cases, the BRSs may be configured to be locally non-unique, but instead transmitted in disjunct transmission resources.

The transmission resources may be assigned in any suitable manner. For example, the transmission resources may be assigned on demand. As another example, the transmission resources may be assigned according to one or more patterns, for example a periodic pattern of transmission instants (e.g., if $TR_{ij}^{(k)}$) is transmitted at slot $t^{(k)}$, then $TR_{ij}^{(k+1)}$ is transmitted at slot $t^{(k+1)}=t^{(k)}+T$, where T denotes the periodicity).

The configuration scope above means that the ambition is that the combination ($BRS_{ij}$, $TR_{ij}^{(k)}$) is locally unique.

In addition, each beam may also transmit a cell identifier or a node identifier that is possibly shared with other beams A group of beams can be formed in numerous ways in order to define a cell. The beams in a group can be served by the same network node 115 or different network nodes 115. Therefore, beams are discussed herein in terms of the tuple ($BRS_{ij}$, $TR_{ij}^{(k)}$). As a first example, a beam group can be formed according to a set of BRSs, such as one or more of a specific list, a range, and a periodic set, independent of transmission resources. As a second example, a beam group can be formed according to a set of transmission resources, such as one or more of a specific list, a range, and a periodic set, independent of BRSs. An example of this second type of beam group is a search space with a specific time duration comprising consecutive transmission resources in time. Another example of this second type of beam group is a set of transmission resources in frequency. The transmission resources may assume that signals contain a synchronization component (i.e., the signal is referred to as an MRS), or rely on a separate synchronization component such as PSS/SSS.

As a third example, a beam group can be formed according to a combined set of BRSs and transmission resources, such as one or more of a specific list of tuples ($BRS_{ij}$, $TR_{ij}^{(k)}$), a range of either BRSs, TRs or both. As a fourth example, a beam group can be formed according to all tuples that share the same transmitted cell or node identifier. The group n is denoted $G^n$.

Based on an obtained measurement configuration (e.g., from a serving base station or via broadcasted system information, or pre-configured), wireless device 110 configures its physical layer for monitoring of beams. The physical layer can be configured to monitor listed search spaces and optionally also listed MRS (or alternatively MRSs are detected blindly). Wireless device 110 performs one or more measurements on the associated reference signal of each beam of the one or more beams included in each of the one or more beam groups. Assuming that the combination (MR-$S_{ij}$, $TR_{ij}^{(k)}$) is locally unique, the physical layer of wireless device 110 can determine a measurement $y_{ij}^{(k)}$ for each beam to be monitored.

Given the configured measurement object (what to measure as part of the measurement management associated to cell definitions based on multiple signals), wireless device 110 can be configured to generate a measurement value per cell. As one example, in certain embodiments wireless device 110 may generate a filtered value based on the best beam as discussed in International Patent Application No. PCT/SE2017/051063 filed Oct. 30, 2017 (which claims priority to U.S. Provisional Patent Application No. 62/417,853, filed Nov. 4, 2016), both of which are hereby incorporated by reference in their entirety. As another example, wireless device 110 may generate a filtered value based on the average value across all beams in a beam group. As still another example, wireless device 110 may generate a filtered value based on the average value across the best M beams in a beam group.

As a particular example, wireless device 110 filters the performed one or more measurements to obtain a filtered measurement value for each of the one or more beam groups. For example, in certain embodiments a per-beam filter in the physical layer determines a filtered value $m_{ij}^{(k)}$ at time k based on historical measurements $y_{ij}^{(k)}$, $y_{ij}^{(k-1)}$ . . . as well as filtering parameters $\theta_1^1, \theta_2^1, \ldots \theta_M^1$ where superscript "1" indicates Layer 1 or physical layer filtering parameters. In case no physical layer filtering is considered, then $m_{ij}^{(k)}=y_{ij}^{(k)}$.

In order to reduce the transfer of measurements from the physical layer to layer 3, the measurements can be combined already in the physical layer. One example is to combine the measurements associated to all beams of a group into one value per time instant. The measurements associated to all beams of a group can be combined into one value per time instant in a variety of ways. For example, using the largest measurement among all measurements associated to beams of the group G at a time instant according to Equation (1) below:

$$M^{(k)} = \max_{ij \in G} m_{ij}^{(k)}. \qquad (1)$$

Moreover, the combining can also note the beam corresponding to the maximum value. Alternatively, for example, the average over the measurements, the median over the measurements, etc. may be used. As another example, in certain embodiments the per beam values $y_{ij}^{(k)}$ could instead be combined into one value according to Equation 2 below:

$$Y^{(k)} = \max_{ij \in G} y_{ij}^{(k)}, \qquad (2)$$

and then filtering in physical layer can be considered by combining $Y^{(k)}, Y^{(k-1)}$ . . . to generate a filtered value $M^{(k)}$.

In case the combining of values from beams of the group are handled by the physical layer (which may, in some cases, be preferred), then layer 3 only receives one value per group and time instant. However, an alternative is that the grouping may be handled in layer 3, based on per beam measurements $M_{ij}^{(k)}=m_{ij}^{(k)}$. This means that the combining will correspond to combining the measurements associated to all beams of a group into one value per time instant, such as, for example, the largest measurement among all measurements associated to beams of the group G at a time instant according to Equation (1) reproduced below:

$$M^{(k)} = \max_{ij \in G} M_{ij}^{(k)}. \qquad (1)$$

Moreover, the combining can also note the beam corresponding to the maximum value. Alternatively, for example, the average over the measurements, the median over the measurements, etc., may be used.

Once the per group measurement value $M^{(k)}$ is prepared, then layer 3 filtering is considered by combining current and historical per group values $M^{(k)}$ into a filtered value $F^{(k)}$. One example of the L3 filtering is the current L3 filter considered in LTE, in which the measurement result is filtered before being used for evaluation of reporting criteria or for measurement reporting. This can be accomplished using Equation 3 below:

$$F_n = (1-a) \cdot F_{n-1} + a \cdot M_n. \qquad (3)$$

where: $M_n$ is the latest received measurement result from the physical layer, $F_n$ is the updated filtered measurement result that is used for evaluation of reporting criteria or for measurement reporting; $F_{n-1}$ is the old filtered measurement result, where $F_0$ is set to $M_1$ when the first measurement result from the physical layer is received; and $a = \frac{1}{2}^{(k/4)}$, where k is the filterCoefficient for the corresponding measurement quantity received by the quantityConfig. Note that k=0 implies no filtering.

The measurement report may be triggered in any suitable manner based on any suitable criteria. For example, given the flexible cell definition via multiple signals, the legacy reporting triggering and measurement report procedures are applicable. In addition, it is also possible to enrich the reporting to indicate, for example, information about the best signal, in terms of signal strength or quality or radio condition in more general terms. In this case, best can mean the best over an averaging window, or in a particular time instant such as the most recent time instant. It may also mean the best over a subset of the considered time instances. As another example, the reporting may indicate information about the search space where the cell or beam reference signal was detected. As another example, the reporting may indicate information about measurement results per individual beam reference signal As a particular example, wireless device 110 may determine, based on at least one filtered measurement value, whether at least one of the one or more conditions that trigger a measurement report by wireless device 110 are satisfied. In certain embodiments, given a value for a beam group, the value can be used when evaluating triggering conditions. The conditions can be based on any suitable criteria. In certain embodiments, the conditions can be based on one or more of the following non-limiting examples: a value from one beam group only; two values from two beam groups, respectively; and one value from a beam group and one from a specific beam.

This enables triggering events that compare, for example, beams at a serving node grouped together compared to beams at a candidate node grouped together. In essence, this resembles the cell comparisons in other RATs such as LTE. As another example, triggering events that compare beams at a serving node grouped together compared to a specific beam at a candidate node may be used. As another example, triggering events that compare a specific beam at the serving node compared to beams at a candidate node grouped together may be used. As another example, triggering events that compare a first beam group with a second beam group. In certain embodiments, the first beam group may include less than all beams in a cell associated with the first beam group, and the second beam group may include all beams in a cell associated with the second beam group. In certain embodiments, the first beam group may include a plurality of beams comprising beams from two or more cells (e.g., at least one beam from a first cell associated with the first beam group and at least one beam from a second cell associated with the first beam group).

The comparisons made in the triggering events could further include, for example, an offset (e.g., signal strength and/or quality) and TTT that are specific for the considered group of cells or beams. This enables a handover configuration adjusted for specific handover regions, as described in more detail below in relation to FIG. 6. Non-limiting examples of events from LTE are described in more detail below.

In the intra-RAT measurement report triggering events specified for LTE, measurements on serving cells (primary and secondary) and neighboring cells are considered (events A1-A5), as well as measurements on reference signals for channel state information, CSI-RS (Event C1-C2). The events focus on cells (or, in the CSI-RS case, the CSI-RS resource) becoming better/worse than one or more given threshold(s), or offset better than another cell (or CSI-RS resource). The slogans of the LTE events include: Event A1: Serving becomes better than threshold; Event A2: Serving becomes worse than threshold; Event A3: Neighbour becomes offset better than PCell/PSCell; Event A4: Neighbour becomes better than threshold; Event A5: PCell/PSCell becomes worse than threshold1 and neighbour becomes better than threshold2; Event A6: Neighbour becomes offset better than SCell; Event C1: CSI-RS resource becomes better than threshold; and Event C2: CSI-RS resource becomes offset better than reference CSI-RS resource.

By using the beam group-based measurement report triggering described above, the risk of problems associated with individual beam-based events (such as too high granularity) may advantageously be reduced. As described above in relation to FIG. 2, using the existing individual beam-based approach in the scenario of FIG. 4 would result in six handovers when wireless device 110 is moving along arrow 410 (described in Table 1 above). In the example of FIG. 4, in contrast, the use of measurement report triggering event(s) based on groups of beams, where beams transmitted from the same network node 115 (e.g., gNB) (or different network nodes 115) are considered to be in the same group, reduces the number of handovers that result. For example, as wireless device 110 moves along arrow 410, the beam-group based reporting described above results in Group 2 405B (including beams 21, 22, and 23 transmitted by network node 115E (gNB2)), and hence beam 22, will not be considered as an attractive handover candidate. Thus, wireless device 110 will instead stay in beam 12 transmitted by network node 115D (gNB1) a bit longer, and then handover to beam 13 a bit earlier than in the example of FIG. 2 described above (which uses individual beam-based triggering events). This way, no ping-pong between network node 115D (gNB 1) and network node 115E (gNB2) will take place. This is shown in Table 2 below:

TABLE 2

Example handover decisions based on groups
of active mode MRS measurements.

| Handover | — | 1b | 2b | 3b | 4b | 5b |
|---|---|---|---|---|---|---|
| New Serving gNB | 115D | 115D | 115D | 115F | 115F | 115F |
| New Serving Beam | 11 | 12 | 13 | 31 | 32 | 33 |

Figure 6:
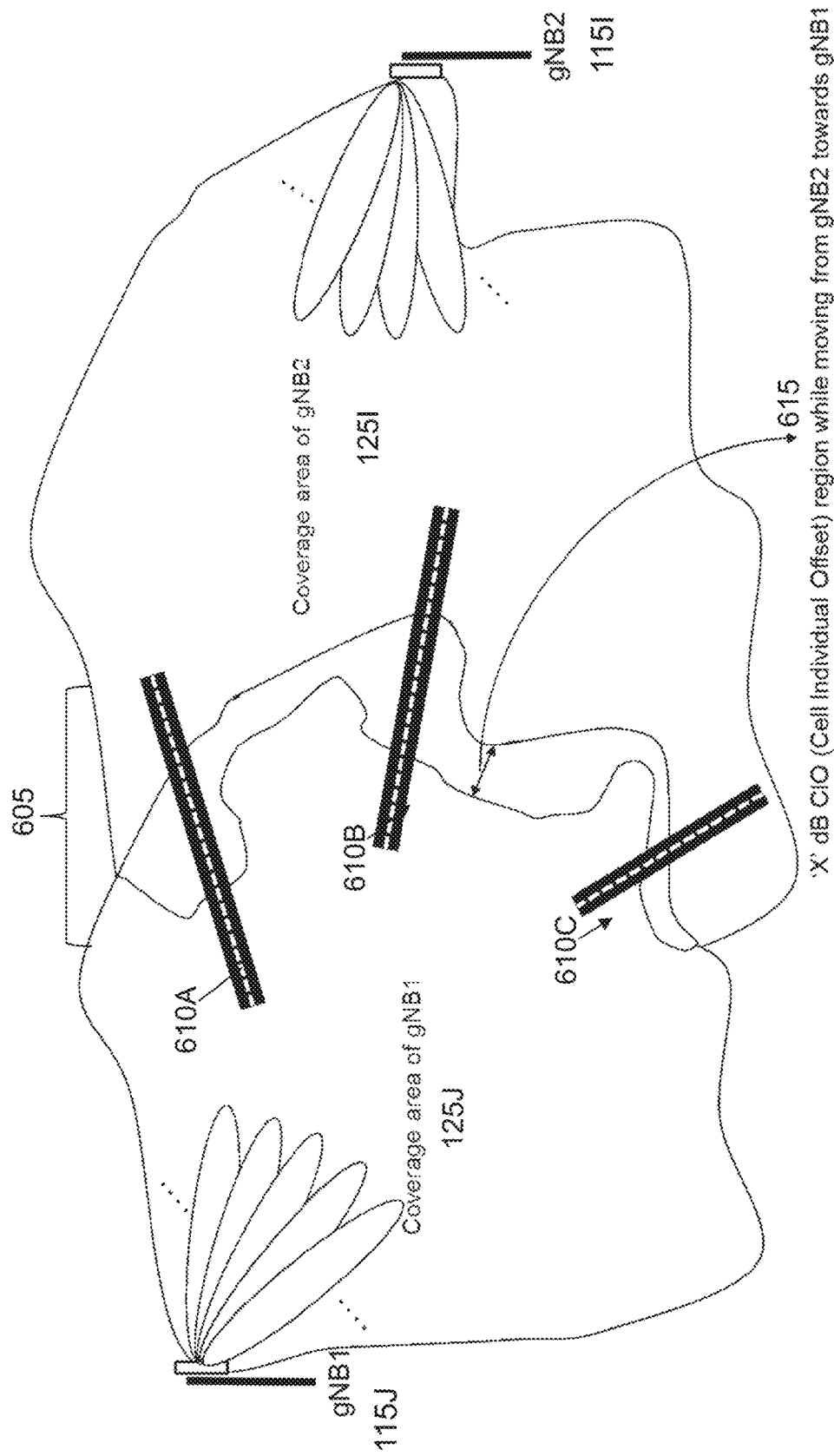
FIG. 6 illustrates an example handover border between two gNBs in NR for the same region shown in the example of FIG. 5, in accordance with certain embodiments.

Although the example described above uses a subset of beams transmitted by a single network node 115, other groupings of beams are possible. Indeed, other groupings of beams than per active mode cell or gNB described can be beneficial. In NR, an active mode cell will consist of several beams. Even in a beam-based scenario, the overall coverage area of the active mode cell in NR could look very similar to the LTE cells as shown in FIG. 6 described below (independent of whether the overall coverage of the connected mode cell is calculated based on the best beam amongst all the beams or the average beam quality amongst all the beams from the connected mode cell is considered for comparing with similar measurement from the neighboring cell).

Figure 5:
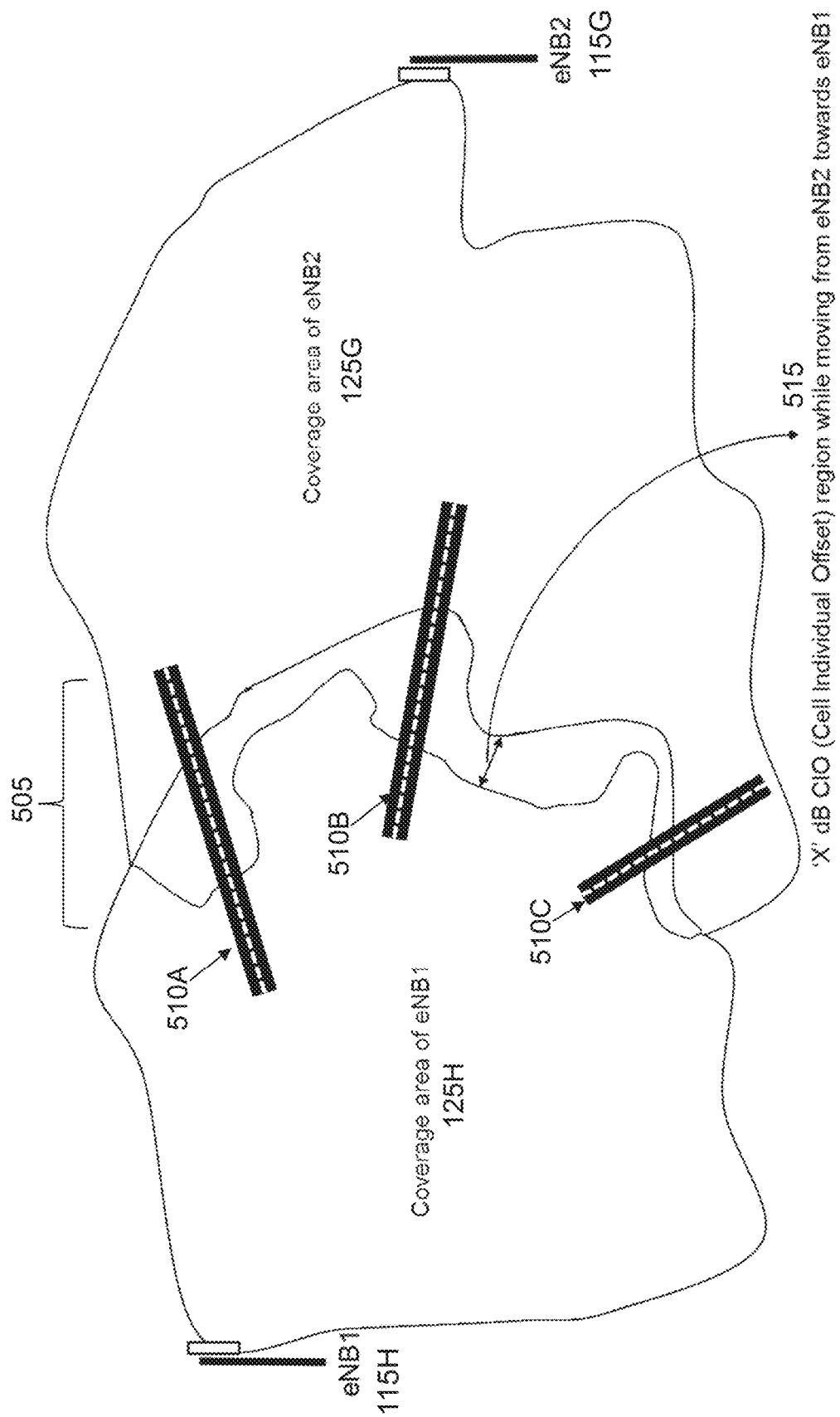
FIG. 5 illustrates an example handover border between two eNBs in LTE, in accordance with certain embodiments.

FIG. 5 illustrates an example handover border 505 between two network nodes in LTE, in accordance with certain embodiments. More particularly, FIG. 5 illustrates an example handover border between a serving network node 115G (e.g., eNB2) and a neighboring network node 115H (e.g., eNB 1) in LTE. Each network node has a particular coverage area (or cell) 125. For example, network node 115G (eNB2) is associated with cell 125G, and network node 115H (eNB1) is associated with cell 125H. In the example of FIG. 5, there are three motorways 510A, 510B, and 510C (e.g., roads on which one or more vehicles drive). Each motorway 510A-C is located along handover border 505 and the region 515 of "X" dB offset between the two cells varies greatly depending on which motorway 510 is being used by a wireless device. As described above, in existing LTE approaches, where no beam information is available, there are situations where the granularity of information used for the handover triggering is either too high or too low. An example scenario in which the granularity of the information used for handover triggering is too high was described above in relation to FIG. 2. In the example of FIG. 5, in contrast, the granularity of information used for the handover triggering is too low because only one CIO value can be set. More particularly, in the example case of FIG. 5 a CIO along with a time to trigger (TTT) are used to ensure that the number of ping-pong handovers and the number of handover failures are kept to a minimum in the network. Due to the difference in the propagation properties in different border areas of two cells, however, the same triggering condition is not suitable over the whole cell border.

In the example of FIG. 5, the region where the RSRP difference between the serving cell 125G (network node 115G (eNB2)) and the neighboring cell 125H (network node 11H (eNB1)) is "–X" dB is in region 515. Due to the difference in the propagation properties in different areas (in some regions of the border 505 only network node 115H (eNB1) might have a line of sight (LOS) whereas in some other parts only network node 115G (eNB2) can have LOS and some other parts there can be no LOS from either of network nodes 115G and 115H) of the handover border 505 between the two cells, the same CIO would act inefficiently for wireless devices in different parts of the handover border 505.

If one would use the same approach in NR as described above (that is, using active mode cell specific mobility events based on an active mode cell or gNB specific reference signal), the advantage of having different handover configurations (e.g., individual offsets) in different directions offered by considering separate beams is lost.

FIG. 6 illustrates an example handover border between two gNBs in NR for the same region shown in the example of FIG. 5, in accordance with certain embodiments. More particularly, FIG. 6 illustrates an example handover border 605 between a serving network node 115I (e.g., gNB2) and a neighboring network node 115J (e.g., gNB1) in NR. Each network node 115 has a particular coverage area (or cell) 125. For example, network node 115I (gNB2) is associated with cell 125I, and network node 115J is associated with cell 125J. In the example of FIG. 6, there are three motorways 610A, 610B, and 610C. Each motorway 610A-C is located along the handover border 605 and the region 615 of "X" dB offset between the two cells varies greatly depending on which motorway is being used by a wireless device. Unlike the example of FIG. 5 described above, in the example of FIG. 6 multiple beams are used at the transmitter side of the gNB compared to sector beams of eNBs of LTE in the previous example of FIG. 5.

In the example of FIG. 6, because different regions of handover border 605 between network nodes 115I (gNB2) and 115J (gNB1) are covered by different beams of the two network nodes 115I and 115J, there is an advantage of grouping the beams from the neighboring network node 115J (gNB1) and assigning group specific configurations for measurement report triggering to optimize mobility between the network node 115I (gNB2) and network node 115J (gNB1). As an example, serving network node 115I (gNB2) could configure a wireless device with two different groups (as described above in relation to FIG. 4) in relation to the beams of neighboring network node 115J (gNB 1).

Signals can be transmitted in various resources. In order to facilitate the wireless devices, the wireless devices may be configured with search spaces where signals might be detected. Signals like PSS/SSS are typically related to an Absolute Radio Frequency Carrier Number (ARFCN), and a periodicity. A wireless device searches for the signal centered around the ARFCN. When measuring signals spread out in time and/or frequency, the device can be configured with a measurement gap, informing where a signal may be detected. Another aspect of search spaces is that two different search spaces can represent two different cells, based on the same set of beam reference signals.

Figure 7:
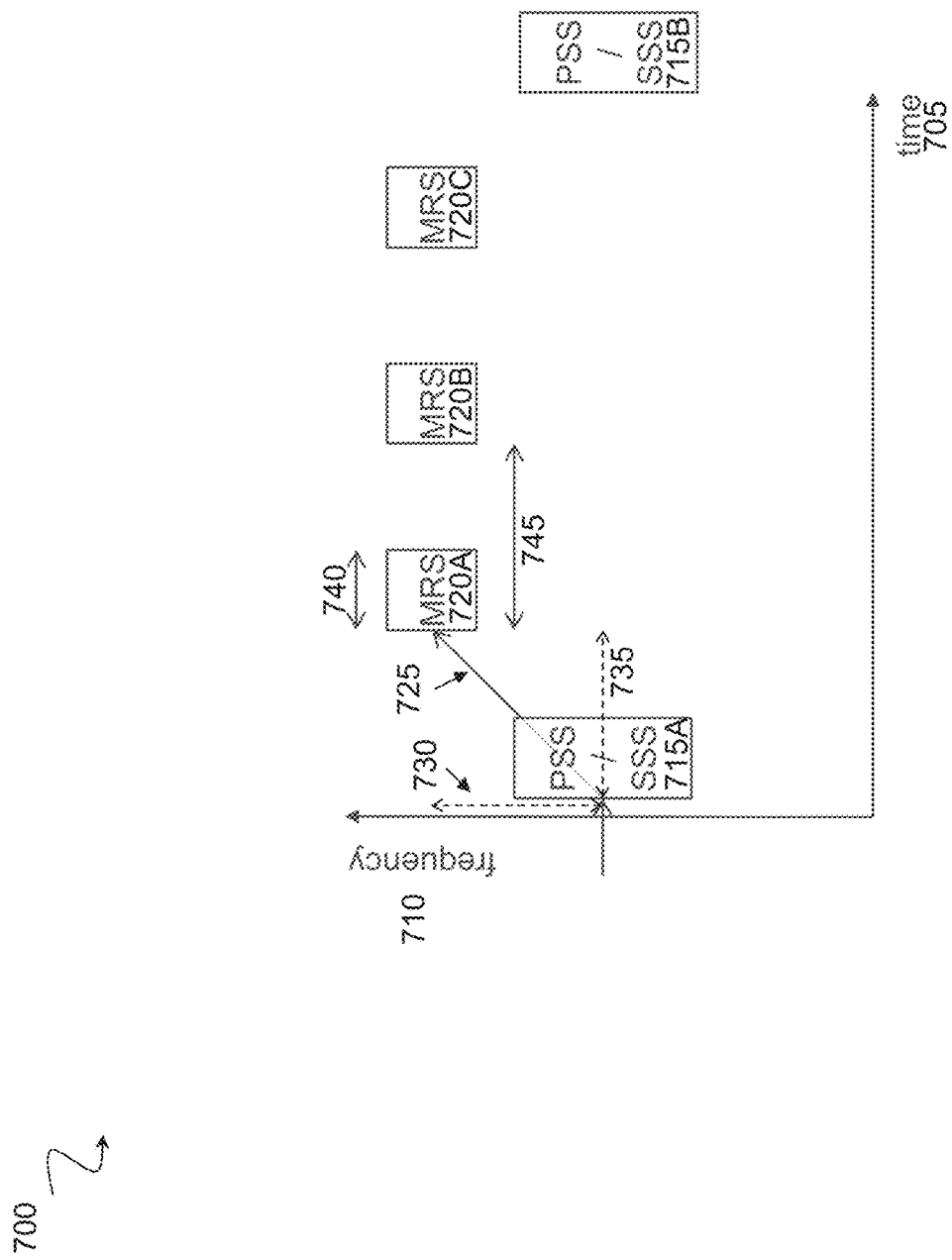
FIG. 7 illustrates an example of a search space definition, in accordance with certain embodiments.

FIG. 7 illustrates an example of a search space definition, in accordance with certain embodiments. More particularly, FIG. 7 illustrates a search space for beam reference signals. In the example of FIG. 7, time-frequency grid 700 illustrates time 705 on the x-axis and frequency 710 on the y-axis. A number of signals are depicted, including PSS/SSS 715 and MRS 720, where PSS/SSS 715A and 715B represent separate transmissions of PSS/SSS 715 and MRS 720A-C represent separate transmissions of MRS 720.

A frequency resource of the search space can be defined in any suitable manner. As one example, the frequency resource of the search space can be defined in absolute terms, like via an ARFCN. In such a scenario. PSS/SSS 715 may be related to an ARFCN (as described above), and a wireless device may be configured to search for the signal centered around the ARFCN.

As another example, the frequency resource of the search space can be defined in relative terms as a frequency offset with respect to a carrier frequency. In some cases, the search space may also be defined in time relative to the time of a separate synchronization signal, such as PSS/SSS 715. This is depicted in the example of FIG. 7 using arrow 725 from PSS/SSS 715A to MRS 720A. In this scenario, the location of MRS 720 in both time and frequency is defined relative to the location of PSS/SSS 715. More specifically, the location of MRS 720 in frequency is defined relative to the carrier frequency of PSS/SSS 715 according to a frequency offset 730, and the location of MRS 720 in time is defined relative to PSS/SSS 715 according to a time offset 735.

In certain embodiments, the search space can comprise a set of contiguous transmission resources represented in the example of FIG. 7 as a duration parameter 740. In some cases, the search space may be periodic, and the period may be defined and provided to the wireless device. In certain embodiments, the periodicity of the search space may be defined by a network node (e.g., gNB) and provided to the wireless device in, for example, the configuration for measurement management associated to cell definitions based on multiple signals. This is illustrated in the example of FIG. 7, where transmission of MRS 720 is repeated with a periodicity 745.

Each search space (or a set of search spaces) can be associated to a search space index. When defining multiple search spaces, the search space index is an identifier of each search space that can be used to identify a search space in the cell definition as well as in the measurement report.

Figure 8:
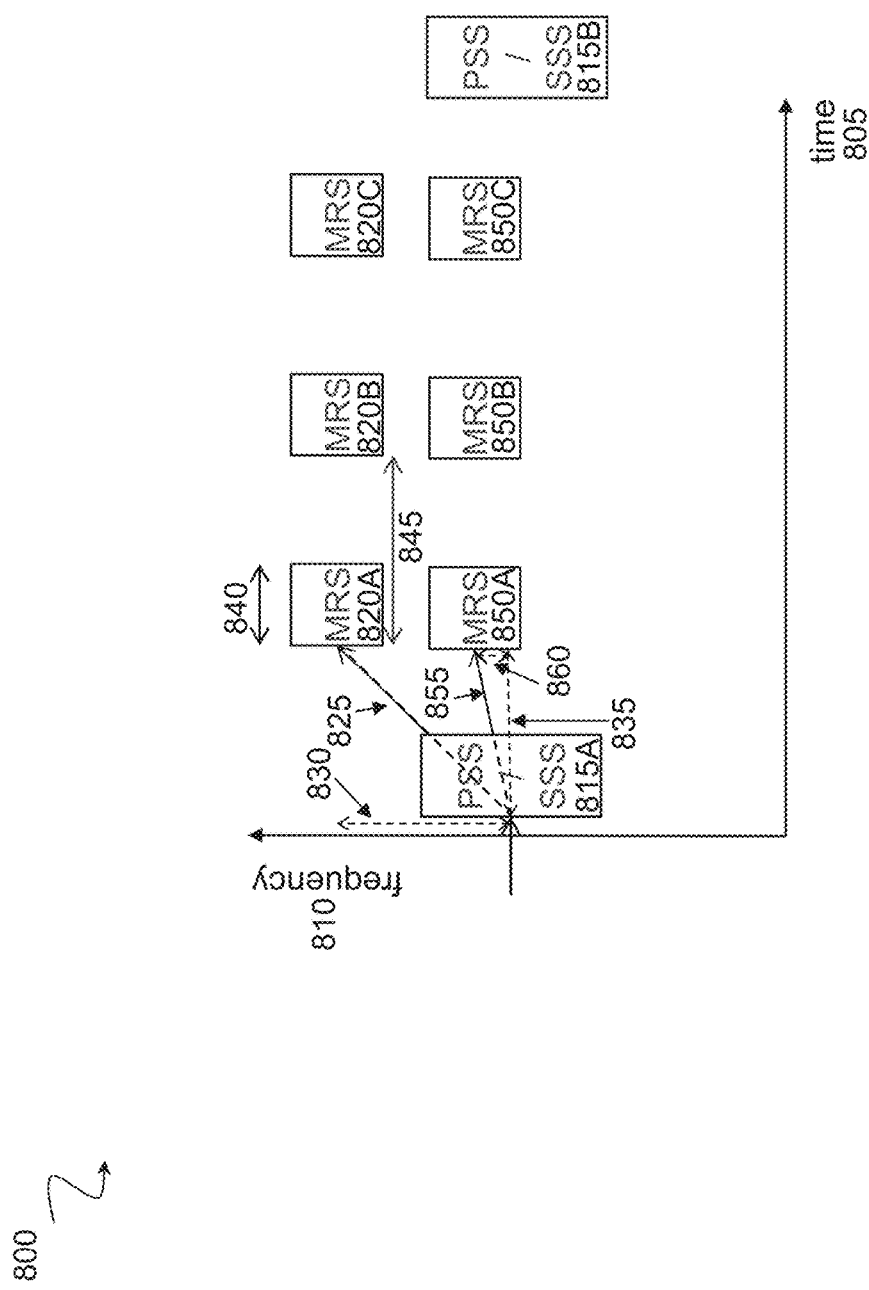
FIG. 8 illustrates an example search space definition with multiple search spaces, in accordance with certain embodiments.

FIG. 8 illustrates an example search space definition with multiple search spaces, in accordance with certain embodiments. FIG. 8 is similar to FIG. 7 described above in that FIG. 8 illustrates a time-frequency grid 800 illustrating time 805 on the x-axis and frequency 810 on the y-axis. In the example of FIG. 8, a first search space comprising MRS 820 is defined in time and frequency relative to PSS/SSS 815. More particularly, (as shown by arrow 825 from PSS/SSS 815A to MRS 820A in the example of FIG. 8), the location of MRS 820 in frequency is defined relative to the carrier frequency of PSS/SSS 815 according to a frequency offset 830, and the location of MRS 820 in time is defined relative to PSS/SSS 815 according to a time offset 835. The first search space is defined as a set of contiguous transmission resources represented by duration 840 with a periodicity 845. In the example of FIG. 8, each of MRS 820A-C represent separate transmissions of MRS 820.

In contrast to the example of FIG. 7, in the example of FIG. 8 a second search space is defined that comprises MRS 850 (where each of MRS 850A-C represent a separate transmission of MRS 850. The second search space comprising MRS 850 is also defined relative to PSS/SSS 815A in a similar manner to that described above with respect to the first search space comprising MRS 820. This is illustrated in FIG. 8 by arrow 855 from PSS/SSS 815A to MRS 850A. The timing offset of MRS 850A relative to PSS/SSS 815A is the same as timing offset 835 for the first search space comprising MRS 820, and the first and second search spaces share the same periodicity 845. As can be seen from FIG. 8, however, frequency offset 860 of the second search space comprising MRS 850A is different from that of the first search space comprising MRS 820.

The search space representation means that it is possible to define multiple search spaces in time and/or frequency. Each search space may be associated to a search space index. The example of FIG. 8 illustrates two different search spaces, thus each may be assigned a different search space index. In certain embodiments, the first search space comprising MRS 820 may be associated to a first search space index and the second search space comprising MRS 850 may be associated to a second search space index. In certain embodiments, a set of search spaces may be defined that includes both the first search space comprising MRS 820 and the second search space comprising MRS 850. In such a scenario, the set of search spaces may be associated with a search space index. When defining multiple search spaces, the search space index can be understood as an identifier of each search space that can be used to identify a search space in the configuration (i.e., cell definition) as well as in the measurement report that may ultimately be sent by a wireless device.

An example configuration representation illustrating some exemplifying configurations of cells based on multiple signals is shown below:

```
G-UTRAN Measurement Object
    carrierFreq              ARFCN-ValueGUTRA
    searchSpaceList          SearchSpaceList
    cellsToAddModList        CellsToAddModList
    SearchSpaceList          SEQUENCE (SIZE (1..maxSS)) OF
                             SearchSpace
SearchSpace
    searchSpaceIndex         INTEGER(1..maxSearchSpaces)
    freqOffset               FreqOffset
    timeOffset               TimeOffset              OPTIONAL
    timeDuration             TimeDuration            OPTIONAL
    periodicity              Periodicity             OPTIONAL
CellsToAddModList            SEQUENCE (SIZE (1..maxSS)) OF
                             CellsToAddMod
CellsToAddMod
    cellIndex                INTEGER (1..maxCellMeas)
    physicalCellID           PhysicalCellID          OPTIONAL
    searchSpaceIndex         INTE-                   OPTIONAL
                             GER(1..maxSearchSpaces)
    beamRsGroup              BeamRsGroup             OPTIONAL
BeamRsGroup                  SEQUENCE (SIZE (1..maxSS)) OF
                             BeamRs
BeamRs
    beamIndex                INTEGER (1..maxBeams)
    beamRsID                 INTEGER (0..maxBeamRs)
    embeddedSynch            BOOLEAN                 OPTIONAL
```

Additional information about the various information elements (IEs) shown in the example configuration above is provided in Table 3 below:

TABLE 3

MeasObjectGUTRA field descriptions carrierFreq
Identifies G-UTRA carrier frequency for which this configuration is valid.
searchSpaceList
List of search spaces where reference signals may be detected.
cellsToAddModList
List, of cells to add/modify in the cell list.
searchSpaceIndex
Entry index in the search space list.
freqOffset
Provides the search space frequency offset in relation to the carrier frequency.
timeOffset
Provides the search space time offset in relation to the PSS of the carrier. Only present if configuring signals without an inherit synch component
timeDuration
Provides the search space time duration.
Periodicity
Search space periodicity.
cellIndex
Entry index in the cell list. An entry may concern a range of cells, in which case this value applies to the entire range.
cellIndividualOffset
Cell individual offset applicable to a specific cell. Value dB-24 corresponds to -24 dB, dB-22 corresponds to -22 dB and so on.

TABLE 3-continued

MeasObjectGUTRA field descriptions physicalCellID
Cell identifier associated to PSS/SSS. Only present if the cell is identified by PSS/SSS.
searchSpaceIndex
Index to identify a search space. Only present if the cell is defined based on signals in a search space.
beamRsGroup
List of beam reference signals. Only present if the cell is defined based on a group of signals.
beamIndex
Index to identify a signal associated to a beam.
beamRsID
Identifier of a beam reference signal.
embeddedSynch
Indicates whether the beam reference signal has a synch component embedded or not.

Figure 9:
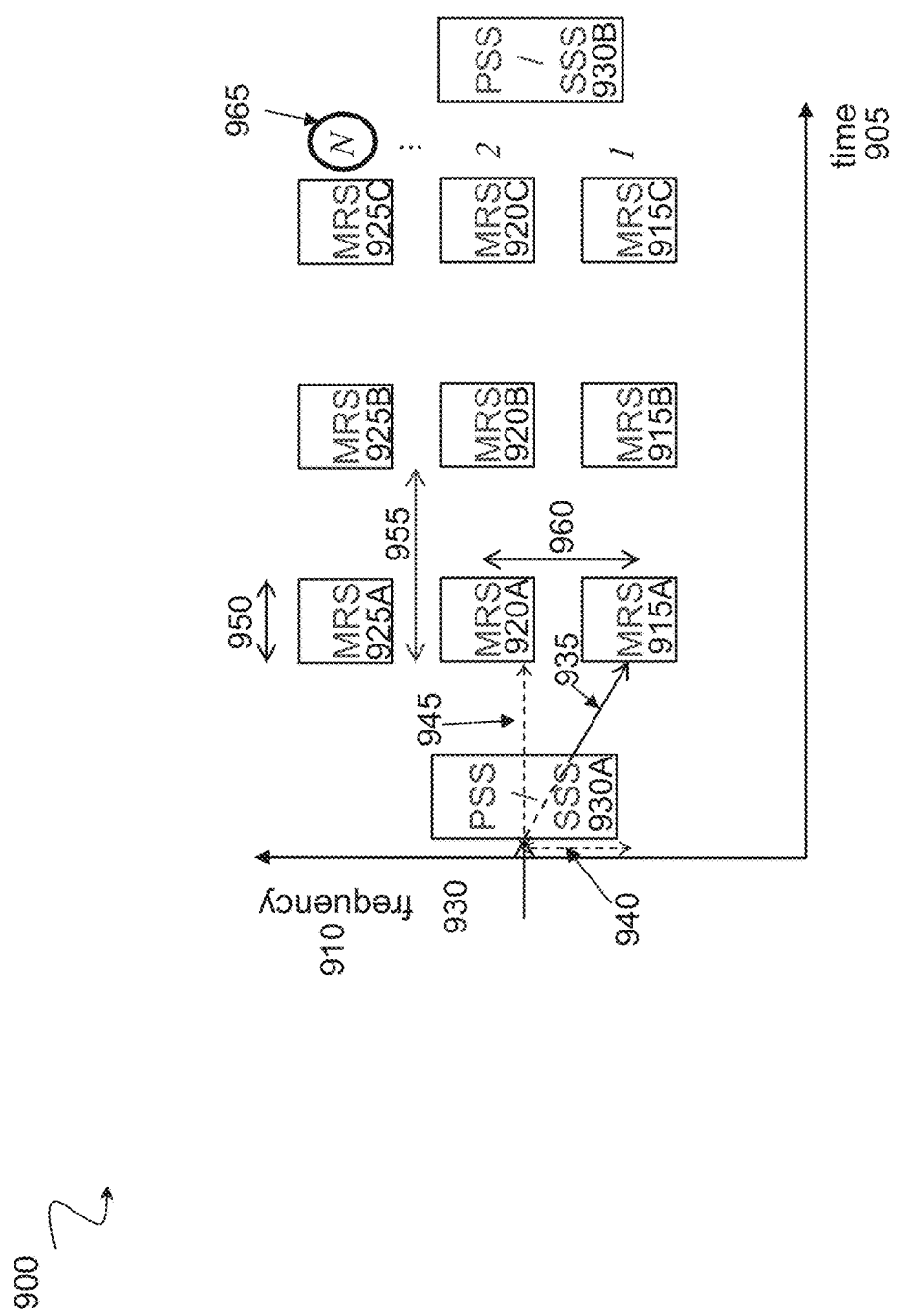
FIG. 9 illustrates an example of a more complex search space, in accordance with certain embodiments.

FIG. 9 illustrates an example of a more complex search space, in accordance with certain embodiments. FIG. 9 illustrates a time-frequency grid 900 illustrating time 905 on the x-axis and frequency 910 on the y-axis. In the example of FIG. 9, the search space definition is more complex in that it includes multiple transmission resources in both time and frequency, including MRS 915A-C (where each of MRS 915A-C represent a separate transmission of MRS 915), 920A-C (where each of MRS 920A-C represent a separate transmission of MRS 920), and 925A-C (where each of MRS 925A-C represent a separate transmission of MRS 925). As noted above, the frequency resource of the search space can be defined in any suitable manner. As one example, the frequency resource of the search space can be defined in absolute terms, like via an ARFCN. In such a scenario, PSS/SSS 930 may be related to an ARFCN (as described above in relation to FIG. 7), and a wireless device may be configured to search for the signal centered around the ARFCN (where each PSS/SSS 930A-B represents a separate transmission of PSS/SSS 930).

As another example (and as shown in FIG. 9), the frequency resource of the search space can be defined in relative terms as a frequency offset with respect to a carrier frequency. In some cases, the search space may also be defined in time relative to the time of a separate synchronization signal, such as PSS/SSS 930. This is depicted in the example of FIG. 9 using arrow 935 from PSS/SSS 930A to MRS 915A. In this scenario, the location of MRS 915A in both time and frequency is defined relative to the location of PSS/SSS 930A. More specifically, the location of MRS 915 in frequency is defined relative to the carrier frequency of PSS/SSS 930 according to a frequency offset 940, and the location of MRS 915 in time is defined relative to PSS/SSS 930 according to a time offset 945. In certain embodiments, the search space can comprise a set of contiguous transmission resources represented in the example of FIG. 9 as a duration parameter 950.

In contrast to the examples of FIGS. 7 and 8 described above, in the example of FIG. 9, transmission resources are incorporated both in time and frequency. This is achieved both via a periodicity parameter 955 in time as well as a periodicity parameter 960 in frequency. In addition, a parameter N 965 is used to define the maximum number of transmission resources in the frequency domain.

In yet another embodiment that also can be illustrated by FIG. 9, the search space definitions can be optimized where a set of search spaces, each with an individual search space index is defined based on a parameterized function. For example, a set of N search spaces with indices from a start index k to k+N−1 can be defined via frequency periodicity parameter 960 and a max number of frequency transmission resources N 965.

An example association between a cell and a search space is shown below:

```
SearchSpaceIndexList      SEQUENCE (SIZE (1..maxSS)) OF
    INTEGER(1..maxSearchSpaces)
CellsToAddMod
    cellIndex             INTEGER (1..maxCellMeas)
    cellIndividualOffset  Q-OffsetRange
    physicalCellID           PhysicalCellID       OPTIONAL
    searchSpaceIndexList     SearchSpaceIndexList OPTIONAL
    beamRsGroup              BeamRsGroup          OPTIONAL
```

In certain embodiments, a cell may be defined based on more than one search space. In that case, the cell is associated to a search space list as shown above. Note that cells can be defined in any suitable manner. As one example, cells can be defined via PSS/SSS as traditionally done. As another example, cells can be defined via any signal in a specified search space. As still another example, cells can be defined via any signal from a given set. As yet another example, cells can be defined via any signal from a given set in a specified search space. These signals may have a synchronization component and the device can search for them directly, or they may not have a search component, and may rely on a separate synchronization signal such as PSS/SSS.

Figure 10:
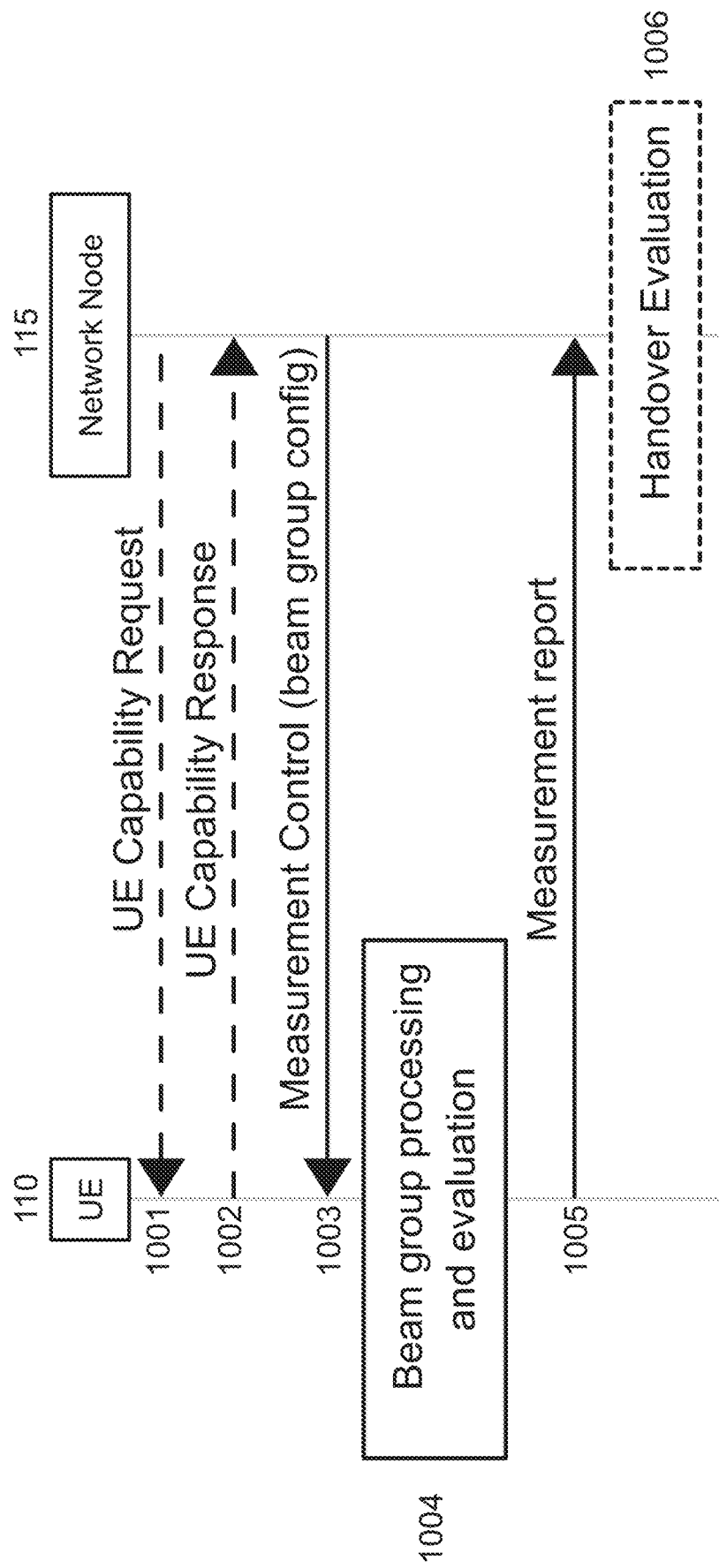
FIG. 10 is an example signaling flow diagram, in accordance with certain embodiments.

FIG. 10 is an example signaling flow diagram, in accordance with certain embodiments. More particularly, FIG. 10 illustrates a signaling flow diagram between a wireless device 110 (a UE in the example of FIG. 10) and a network node 115 (e.g., a gNB or an eNB). Network node 115 may be a serving network node for wireless device 110.

At step 1001, network node 115 sends a capability request to wireless device 110, requesting capability information regarding the capability of wireless device 110 to support measurement management associated to cell definitions based on multiple signals. At step 1002, wireless device 110 sends a capability response to network node 115 indicating its capability associated to measurement management associated to cell definitions based on multiple signals. For capable wireless devices, at step 1003 network node 115 sends information about a configuration for measurement management associated to cell definitions based on multiple signals.

At step 1004, wireless device 110 uses the information about the configuration for measurement management associated to cell definitions based on multiple signals to process per-beam measurements and evaluate report triggering conditions, for example as described above in relation to FIGS. 3-9. At step 1005, when a measurement report triggering condition is met, wireless device 110 sends a measurement report to network node 115. The measurement report may provide information about the cell based on multiple signals. In certain embodiments, at step 1006, network node 115 may evaluate handover decisions based on the measurement reports.

Figure 11:
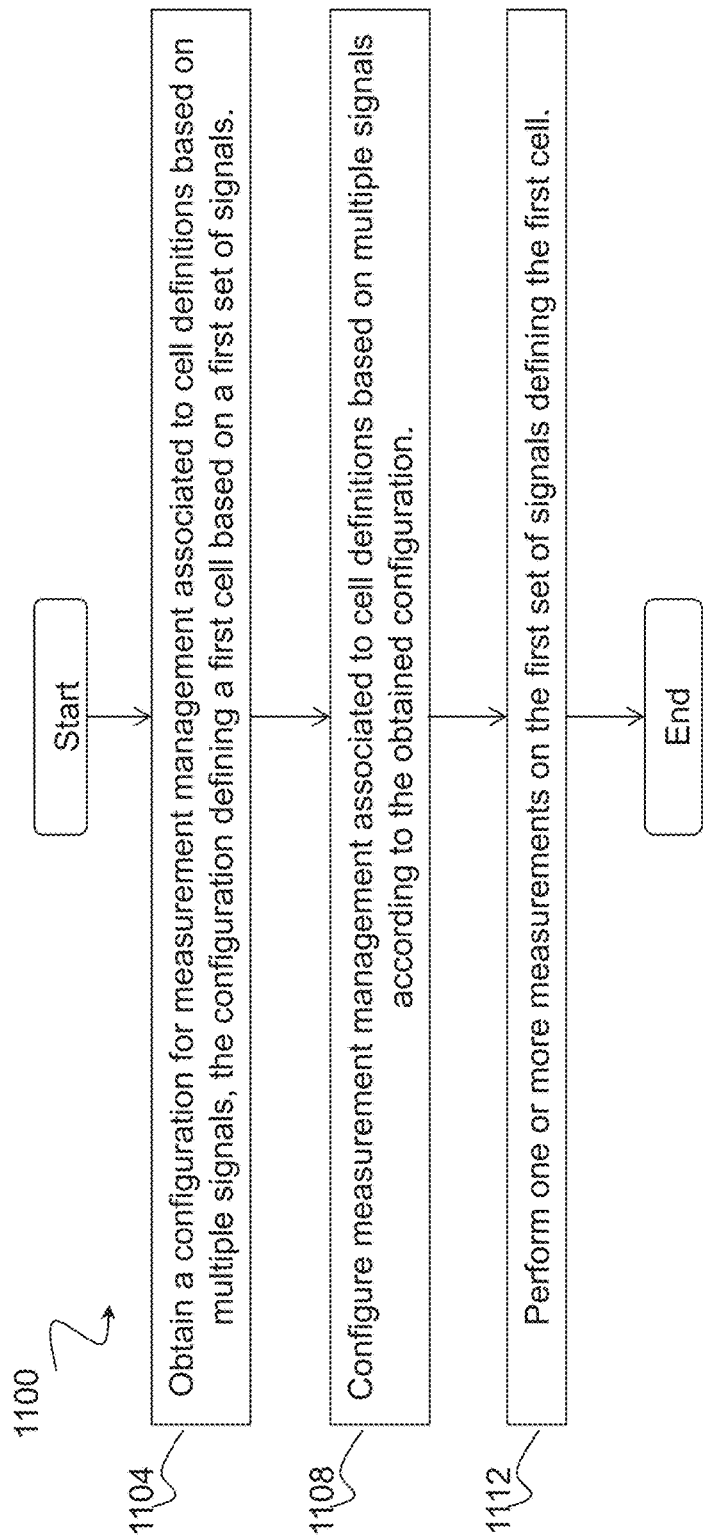
FIG. 11 is a flow diagram of a method in a wireless device, in accordance with certain embodiments.

FIG. 11 illustrates a flow diagram of a method 1100 in a wireless device, in accordance with certain embodiments. Method 1100 begins at step 1104, where the wireless device obtains a configuration for measurement management associated to cell definitions based on multiple signals, the configuration defining a first cell based on a first set of signals. In certain embodiments, the configuration may be part of a measurement object. In certain embodiments, the multiple signals may be associated to one or more of: a same time instant or a different time instant; a same frequency location or a different frequency location; a same antenna configuration or a different antenna configuration; a same node association or a different node association; a same code association or a different code association; a same sequence association or a different sequence association, and one or more synchronization signals.

In certain embodiments, the first cell may be defined via one of: a primary synchronization sequence and a secondary synchronization sequence; a signal in a specified search space; a signal from the first set of signals; and a signal from the first set of signals in a search space.

In certain embodiments, the first set of signals may be associated to a first search space where the first set of signals might be detected. In certain embodiments, the configuration may further define a second cell based on a second set of signals. The second set of signals may be associated to a second search space where the second set of signals might be detected, and the second search space may be different from the first search space. In certain embodiments, the first search space may comprise at least one of: a set of contiguous transmission resources; and multiple transmission resources in both time and frequency. In certain embodiments, the first search space may be associated to a first search space index, and the method may comprise receiving the first search space index associated to the first search space. In certain embodiments, a frequency resource of the first search space may be defined in one of: absolute terms; or relative terms as a frequency offset with respect to a carrier frequency.

In certain embodiments, the first set of signals may be a beam group. The beam group may be defined as one of a set of reference signals independent of transmission resources; a set of transmission resources independent of reference signals; a combined set of reference signals and transmission resources; a group of beams sharing the same transmitted cell identifier; a group of beams sharing the same node identifier, and a group of beams sharing the same transmission/reception point.

In certain embodiments, obtaining the configuration for measurement management associated to cell definitions based on multiple signals may comprise one of: receiving the configuration for measurement management associated to cell definitions based on multiple signals; and determining a pre-defined configuration for measurement management associated to cell definitions based on multiple signals. In certain embodiments, the method may comprise receiving a request for capability information associated to cell definitions based on multiple signals, and sending capability information, the capability information indicating the capability of the wireless device for supporting measurement management associated to cell definitions based on multiple signals.

At step 1108, the wireless device configures measurement management associated to cell definitions based on multiple signals according to the obtained configuration. At step 1112, the wireless device performs one or more measurements on the first set of signals defining the first cell.

In certain embodiments, the method may comprise generating a measurement value for the first cell based on the one or more measurements performed on the first set of signals defining the first cell. In certain embodiments, each of the one or more measurements performed on the first set of signals defining the first cell may be a per-beam measurement, and generating the measurement value for the first cell may comprise combining a plurality of per-beam measurements into a per-cell measurement.

In certain embodiments, the method may comprise evaluating one or more measurement report triggering conditions based on the one or more measurements performed on at least the first set of signals defining the first cell, and sending a measurement report to a network node when a measurement report triggering condition is met, the measurement report comprising information about the first cell. The information about the first cell may comprise one or more of: information about a best beam; information about a cell defined via the multiple signals; information about an associated cell individual offset; and information about one or more search spaces.

Figure 12:
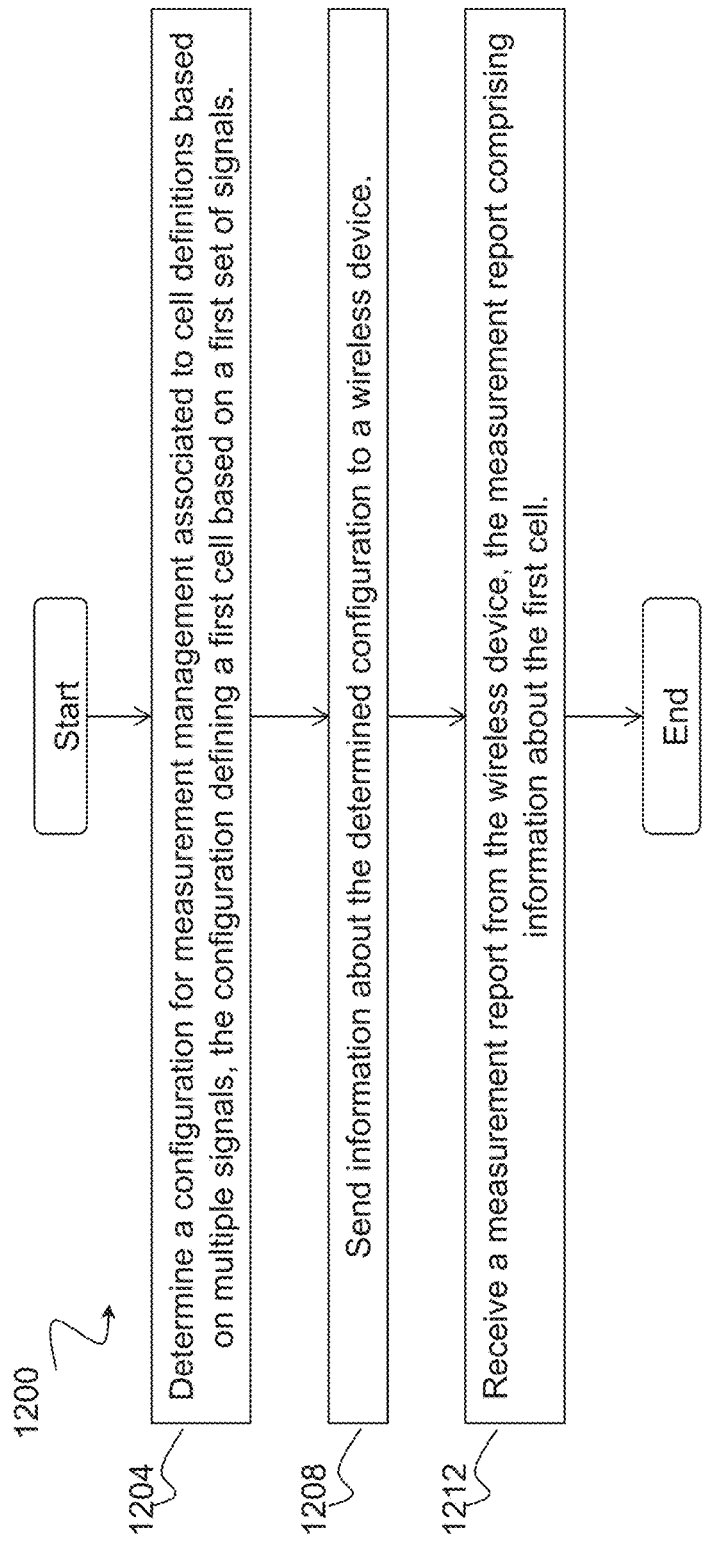
FIG. 12 is a flow diagram of a method in a network node, in accordance with certain embodiments.

FIG. 12 illustrates a flow diagram of a method 1200 in a network node, in accordance with certain embodiments. Method 1200 begins at step 1204, where the network node determines a configuration for measurement management associated to cell definitions based on multiple signals, the configuration defining a first cell based on a first set of signals. In certain embodiments, the multiple signals may be associated to one or more of: a same time instant or a different time instant; a same frequency location or a different frequency location; a same antenna configuration or a different antenna configuration; a same node association or a different node association; a same code association or a different code association; a same sequence association or a different sequence association; and one or more synchronization signals.

In certain embodiments, the first cell may be defined via one of: a primary synchronization sequence and a secondary synchronization sequence; a signal in a specified search space; a signal from the first set of signals; and a signal from the first set of signals in a search space.

In certain embodiments, the first set of signals may be associated to a first search space where the first set of signals might be detected. In certain embodiments, the configuration may further define a second cell based on a second set of signals. The second set of signals may be associated to a second search space where the second set of signals might be detected, and the second search space may be different from the first search space. In certain embodiments, the first search space may comprise at least one of: a set of contiguous transmission resources; and multiple transmission resources in both time and frequency. In certain embodiments, a frequency resource of the first search space may be defined in one of: absolute terms; or relative terms as a frequency offset with respect to a carrier frequency. In certain embodiments, the first search space may be associated to a first search space index, and the method may comprise sending, to the wireless device, the first search space index associated to the first search space.

In certain embodiments, the first set of signals may be a beam group. The beam group may be defined as one of a set of reference signals independent of transmission resources; a set of transmission resources independent of reference signals; a combined set of reference signals and transmission resources; a group of beams sharing the same transmitted cell identifier; a group of beams sharing the same node identifier; and a group of beams sharing the same transmission/reception point.

In certain embodiments, the method may comprise sending a request for capability information associated to cell definitions based on multiple signals to the wireless device, and receiving the capability information from the wireless device.

At step 1208, the network node sends information about the determined configuration to a wireless device. In certain embodiments, sending information about the determined configuration to the wireless device may comprise sending information about the determined configuration as part of a measurement object. In certain embodiments, sending information about the determined configuration to the wireless device may comprise sending the configuration for measurement management associated to cell definitions based on multiple signals to the wireless device. In certain embodiments, the configuration for measurement management associated to cell definitions based on multiple signals may be predefined, and sending information about the determined configuration to the wireless device may comprise sending an indication of a predefined configuration to the wireless device.

At step 1212, the network node receives a measurement report from the wireless device, the measurement report comprising information about the first cell. The information about the first cell may comprise one or more of: information about a best beam; information about a cell defined via the multiple signals; information about an associated cell individual offset; and information about one or more search spaces. In certain embodiments, the method may comprise evaluating handover decisions based on the received measurement report.

Figure 13:
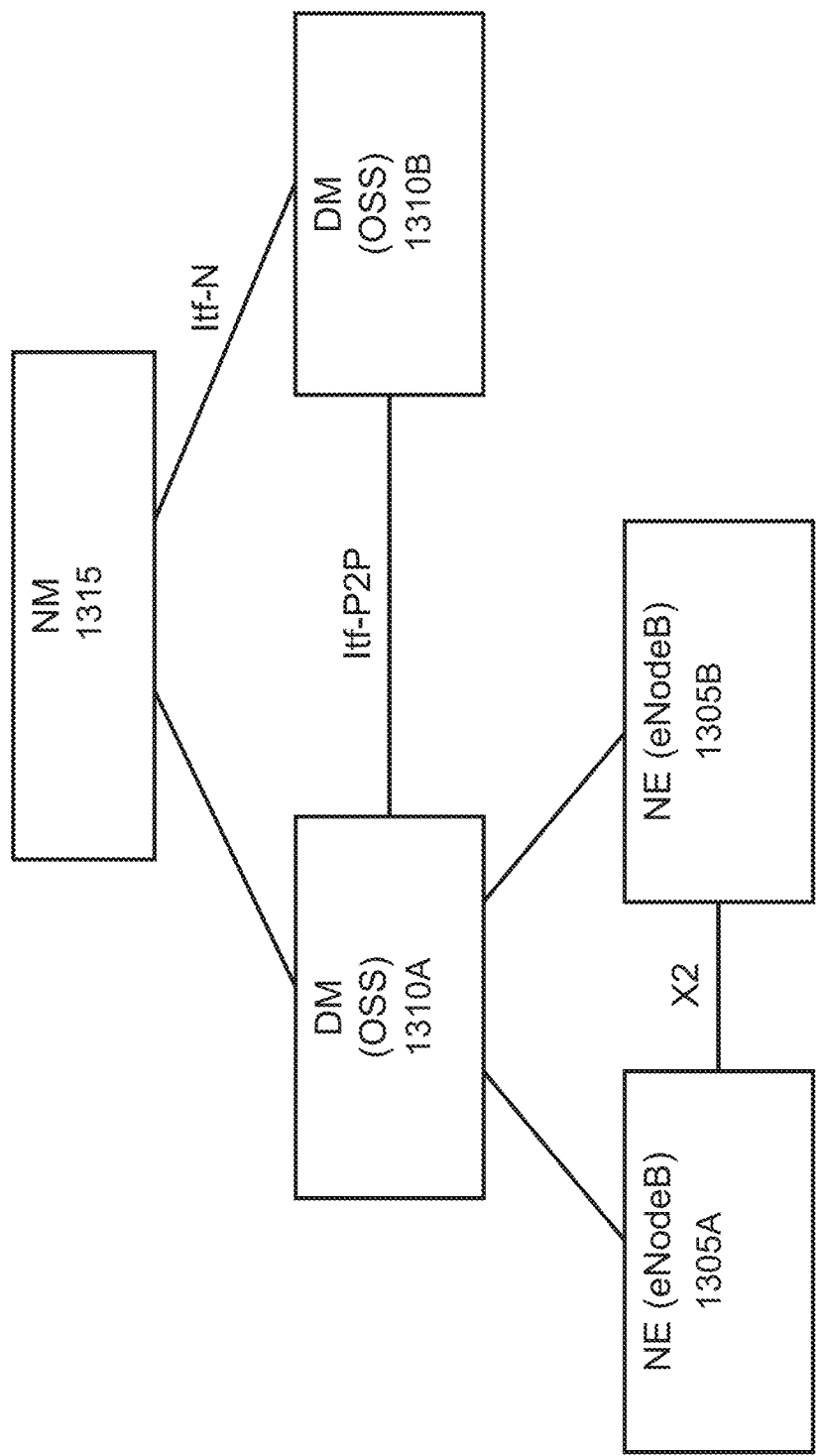
FIG. 13 illustrates an example optional management architecture, in accordance with certain embodiments.

FIG. 13 illustrates an example optional management architecture, in accordance with certain embodiments. In the example of FIG. 13, the node elements (NE) 1305A-B (e.g., gNBs or eNBs) are managed by a domain manager (DM) 1310 (also referred to as the OSS). A DM 1310 may further be managed by a network manager (NM) 1315. The two NEs 1305A-B are interfaced by X2 (or another suitable interface, depending on the RAT), whereas the interface between the two DMs 1310A-B is referred to as Itf-P2P. The interface between NM 1315 and DMs 1310A-B is referred to as Itf-N. The management system may configure NEs 1305, as well as receive observations associated to features in NEs 1305. For example, in certain embodiments DM 1310A observes and configures NEs 1305A and 1305B, while NM 1315 observes and configures DMs 1310A and 1310B, as well as NEs 1305A and 1305B via DM 1310A. By means of configuration via DMs 1310A and 1310B, NM 1315 and related interfaces, functions over the interfaces (e.g., X2 and S1) may be carried out in a coordinated way throughout the RAN, eventually involving the Core Network (e.g., MME and S-GWs).

In certain embodiments, the cell definitions based on multiple signals and associated configurations described herein can be handled within the NEs 1305A and/or 1305B (e.g., gNBs, eNBs). In some embodiments, the cell definitions may be configured in an Operation and Maintenance (OAM) system node (e.g., DM 1310A and/or DM 1310B) and provided to the NEs 1305A-B. The cell definitions may be associated with information regarding how the different configurations shall be used for different individuals, etc.

The OAM system node may also configure performance monitoring associated to the cell definitions, such as what measurements that NEs 1305A-B shall aggregate and report. NEs 1305A-B may be configured to aggregate information about the performance associated to cell definitions. For example, handover statistics may be aggregated per defined cell, such as successful and failed attempts, possibly separated per groups of individuals such as by speed, device type, subscription, or any other suitable criteria. As another example, NEs 1305A-B may be configured to include information about the best beam signal, etc.

Figure 14:
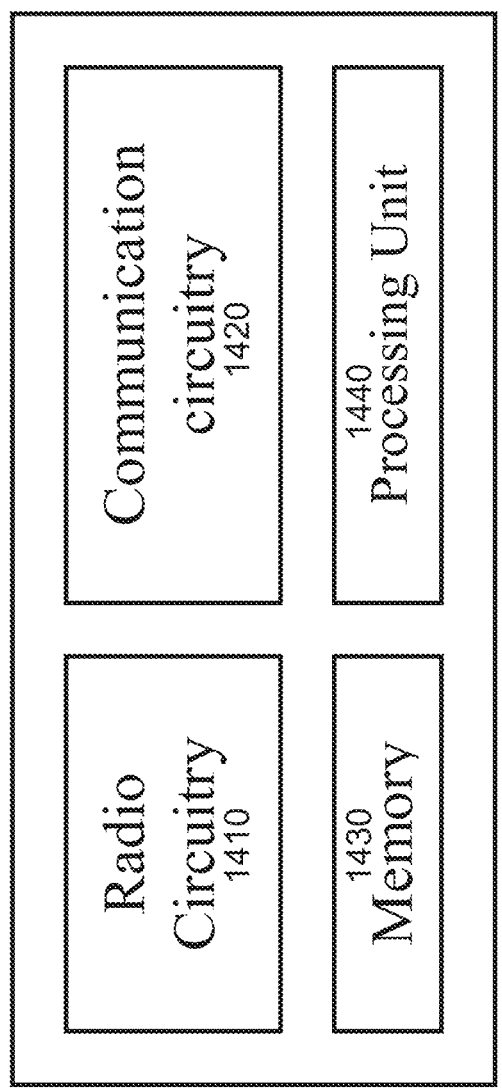
FIG. 14 is a block schematic of an exemplary network node, in accordance with certain embodiments.

FIG. 14 is a block schematic of an exemplary network node, in accordance with certain embodiments. The example network node of FIG. 14 (e.g., an eNB or gNB) may be configured to perform the methods of flexible cell definitions based on signal sets described above with respect to FIGS. 1-13. The example network node of FIG. 14 may be arranged with radio circuitry 1410 to communicate with served wireless devices (e.g., UEs), communication circuitry 1420 to communicate with other radio network, core network, and OAM system nodes, memory 1430 to store information related to the embodiments described above, and a processing unit 1440.

Communication circuitry 1420 may be configured to receive information from the OAM system about cell definitions based on multiple signals, and also to provide performance monitoring information to the OAM system. Processing unit 1440 may be configured to decide suitable cell definition configurations to be provided to one or more wireless devices via radio circuitry 1410. Memory 1430 may be configured to store information about served wireless device, as well as information about cell definition configurations and measurement report triggering configurations. Radio circuitry 1410 may be configured to communicate with served wireless devices, including configuring measurement reporting from such wireless devices, and receiving measurement reports.

Figure 15:
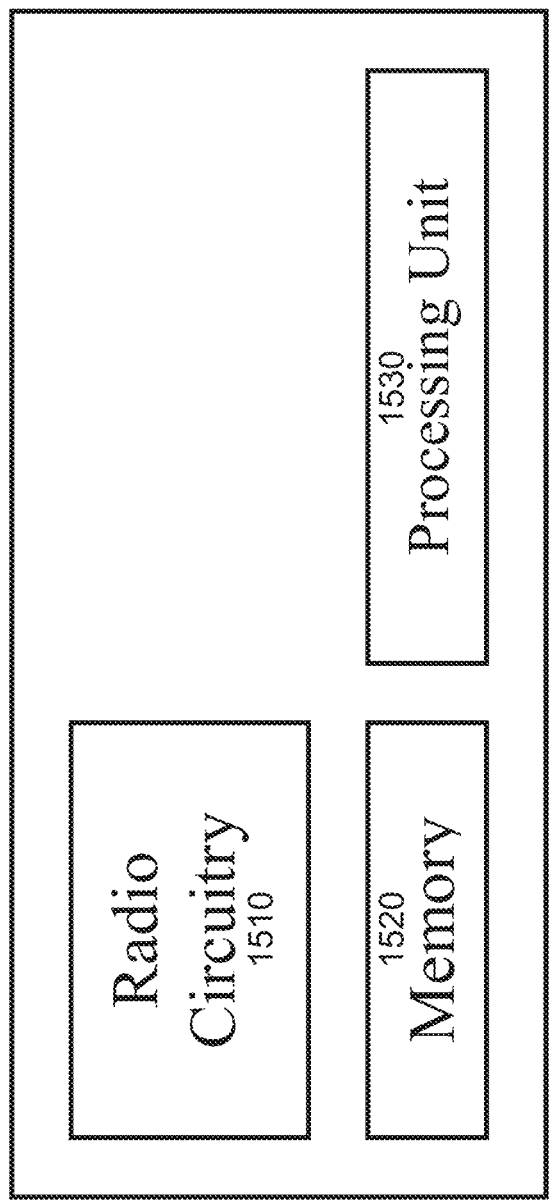
FIG. 15 is a block schematic of an exemplary wireless device, in accordance with certain embodiments.

FIG. 15 is a block schematic of an exemplary wireless device, in accordance with certain embodiments. A wireless device, such as a UE, may be configured to perform the methods of flexible cell definitions based on signal sets described above with respect to FIGS. 1-13. The example wireless device of FIG. 15 may be arranged with radio circuitry 1510 to communicate with a network node (e.g., a serving base station), memory 1520 to store information related to the various embodiments described above, and a processing unit 1530.

Radio circuitry 1510 may be configured to communicate with a network node (e.g., the serving base station), including receiving beam group report triggering configurations and sending measurement reports. Radio circuitry 1510 may also be configured to detect, monitor and measure cells defined via multiple signals associated to beams, optionally restricted to provided search spaces or transmission resources. The measured information is provided to processing unit 1530 for further processing. Processing unit 1530 may be configured to process the per beam measurements in relation to the cell definition and to consider and evaluate measurement report triggering conditions. Processing unit 1530 may be split in layers, for example to process physical layer and layer 3 separately (as well as an intermediate layer 2). Processing unit 1530 may indicate identifiers of individual beams and search spaces in the reports. Memory 1520 may be configured to store information about cell definitions and beam group report triggering configurations.

Figure 16:
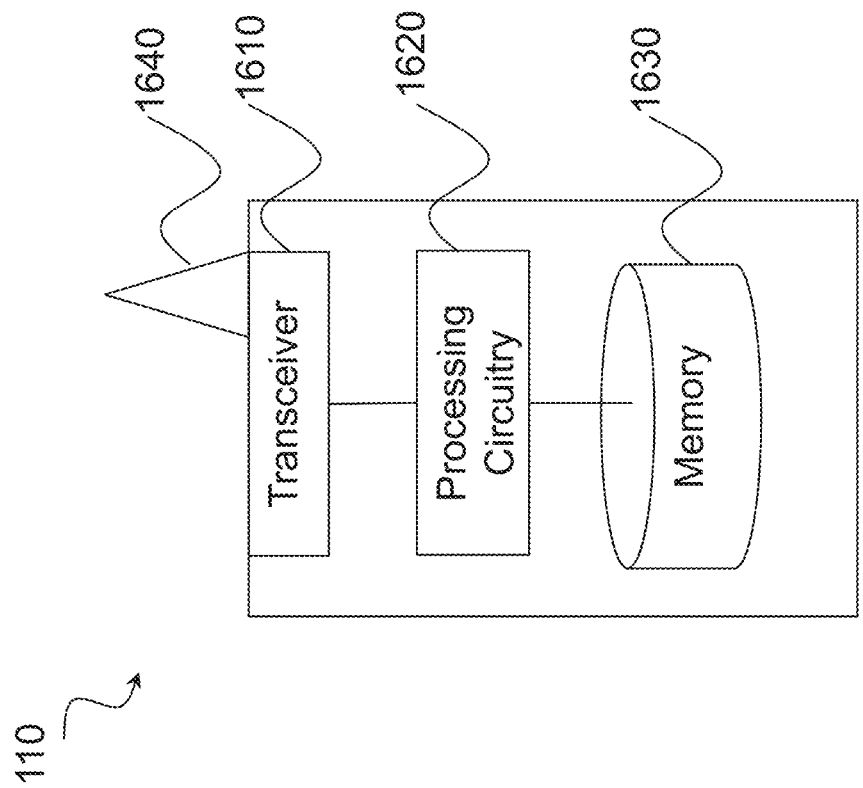
FIG. 16 is a block schematic of an exemplary wireless device, in accordance with certain embodiments.

FIG. 16 is a block schematic of an exemplary wireless device, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Wireless device 110 includes transceiver 1610, processing circuitry 1620, and memory 1630. In some embodiments, transceiver 1610 facilitates transmitting wireless signals to and receiving wireless signals from network node 115 (e.g., via antenna 1640), processing circuitry 1620 executes instructions to provide some or all of the functionality described above as being provided by wireless device 110, and memory 1630 stores the instructions executed by processing circuitry 1620.

Processing circuitry 1620 may include any suitable combination of hardware and software implemented in one or more modules to execute instructions and manipulate data to perform some or all of the described functions of wireless device 110, such as the functions of wireless device 110 described above in relation to FIGS. 1-15. In some embodiments, processing circuitry 1620 may include, for example, one or more computers, one or more central processing units (CPUs), one or more microprocessors, one or more applications, one or more application specific integrated circuits (ASICs), one or more field programmable gate arrays (FPGAs), and/or other logic.

Memory 1630 is generally operable to store instructions, such as a computer program, software, an application including one or more of logic, rules, algorithms, code, tables, etc. and/or other instructions capable of being executed by a processor. Examples of memory 1630 include computer memory (for example. Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processing circuitry 1620.

Other embodiments of wireless device 110 may include additional components beyond those shown in FIG. 16 that may be responsible for providing certain aspects of the wireless device's functionality, including any of the functionality described above and/or any additional functionality (including any functionality necessary to support the solution described above). As just one example, wireless device 110 may include input devices and circuits, output devices, and one or more synchronization units or circuits, which may be part of the processing circuitry 1620. Input devices include mechanisms for entry of data into wireless device 110. For example, input devices may include input mechanisms, such as a microphone, input elements, a display, etc. Output devices may include mechanisms for outputting data in audio, video and/or hard copy format. For example, output devices may include a speaker, a display, etc.

Figure 17:
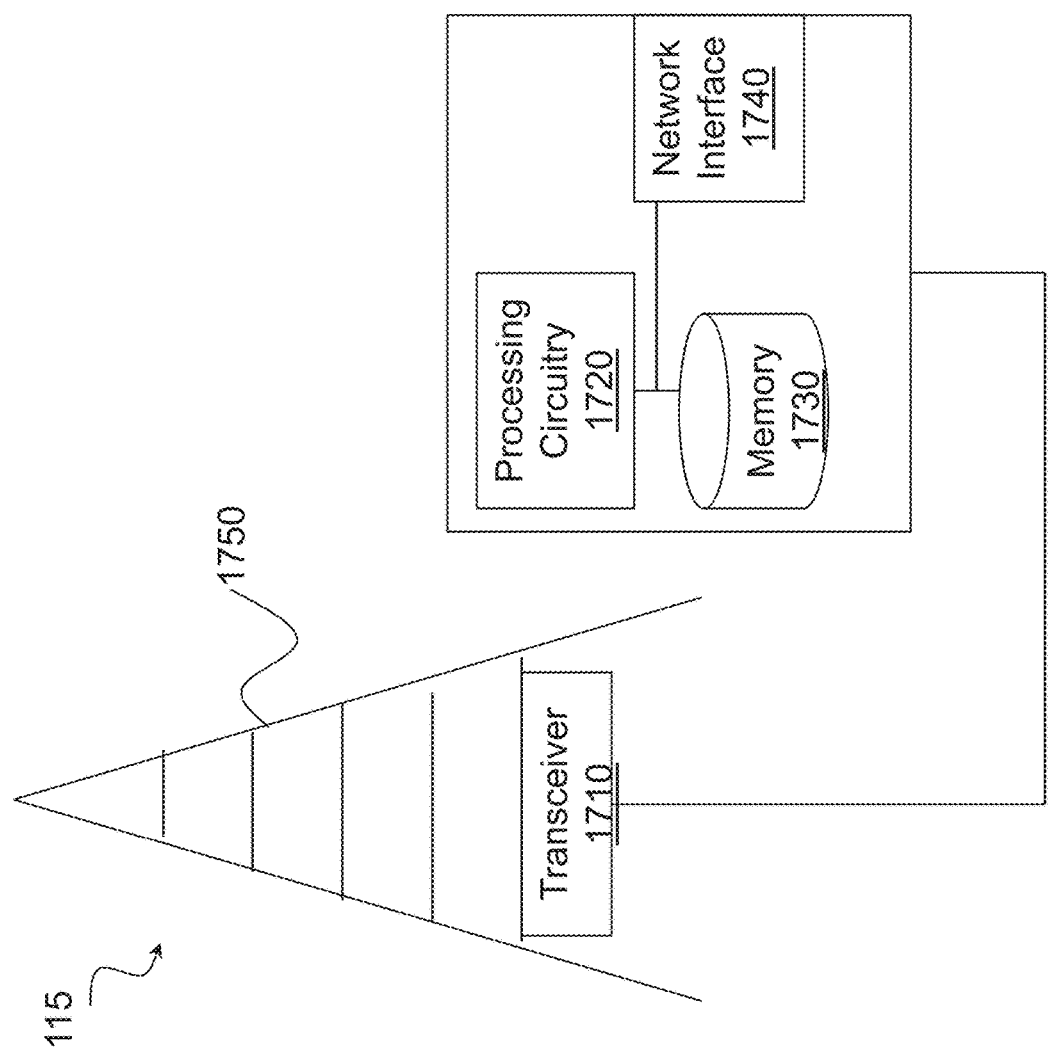
FIG. 17 is a block schematic of an exemplary network node, in accordance with certain embodiments.

FIG. 17 is a block schematic of an exemplary network node, in accordance with certain embodiments. Network node 115 may be any type of radio network node or any network node that communicates with a UE and/or with another network node. Examples of network node 115 include an eNodeB, a gNB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 1710, processing circuitry 1720, memory 1730, and network interface 1740. In some embodiments, transceiver 1710 facilitates transmitting wireless signals to and receiving wireless signals from wireless device 110 (e.g., via antenna 1750), processing circuitry 1720 executes instructions to provide some or all of the functionality described above as being provided by a network node 115, memory 1730 stores the instructions executed by processing circuitry 1720, and network interface 1740 communicates signals to backend network components, such as a gateway, switch, router, Internet. Public Switched Telephone Network (PSTN), core network nodes or radio network controllers 130, etc.

Processing circuitry 1720 may include any suitable combination of hardware and software implemented in one or more modules to execute instructions and manipulate data to perform some or all of the described functions of network node 115, such as those described above in relation to FIGS. 1-15 above. In some embodiments, processing circuitry 1720 may include, for example, one or more computers, one or more CPUs, one or more microprocessors, one or more applications, one or more ASICs, one or more FPGAs, and/or other logic.

Memory 1730 is generally operable to store instructions, such as a computer program, software, an application including one or more of logic, rules, algorithms, code, tables, etc. and/or other instructions capable of being executed by a processor. Examples of memory 1730 include computer memory (for example, RAM or ROM), mass storage media (for example, a hard disk), removable storage media (for example, a CD or a DVD), and/or or any other volatile or non-volatile, non-transitory computer-readable and/or computer-executable memory devices that store information.

In some embodiments, network interface 1740 is communicatively coupled to processing circuitry 1720 and may refer to any suitable device operable to receive input for network node 115, send output from network node 115, perform suitable processing of the input or output or both, communicate to other devices, or any combination of the preceding. Network interface 1740 may include appropriate hardware (e.g., port, modem, network interface card, etc.) and software, including protocol conversion and data processing capabilities, to communicate through a network.

Other embodiments of network node 115 may include additional components beyond those shown in FIG. 17 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 18:
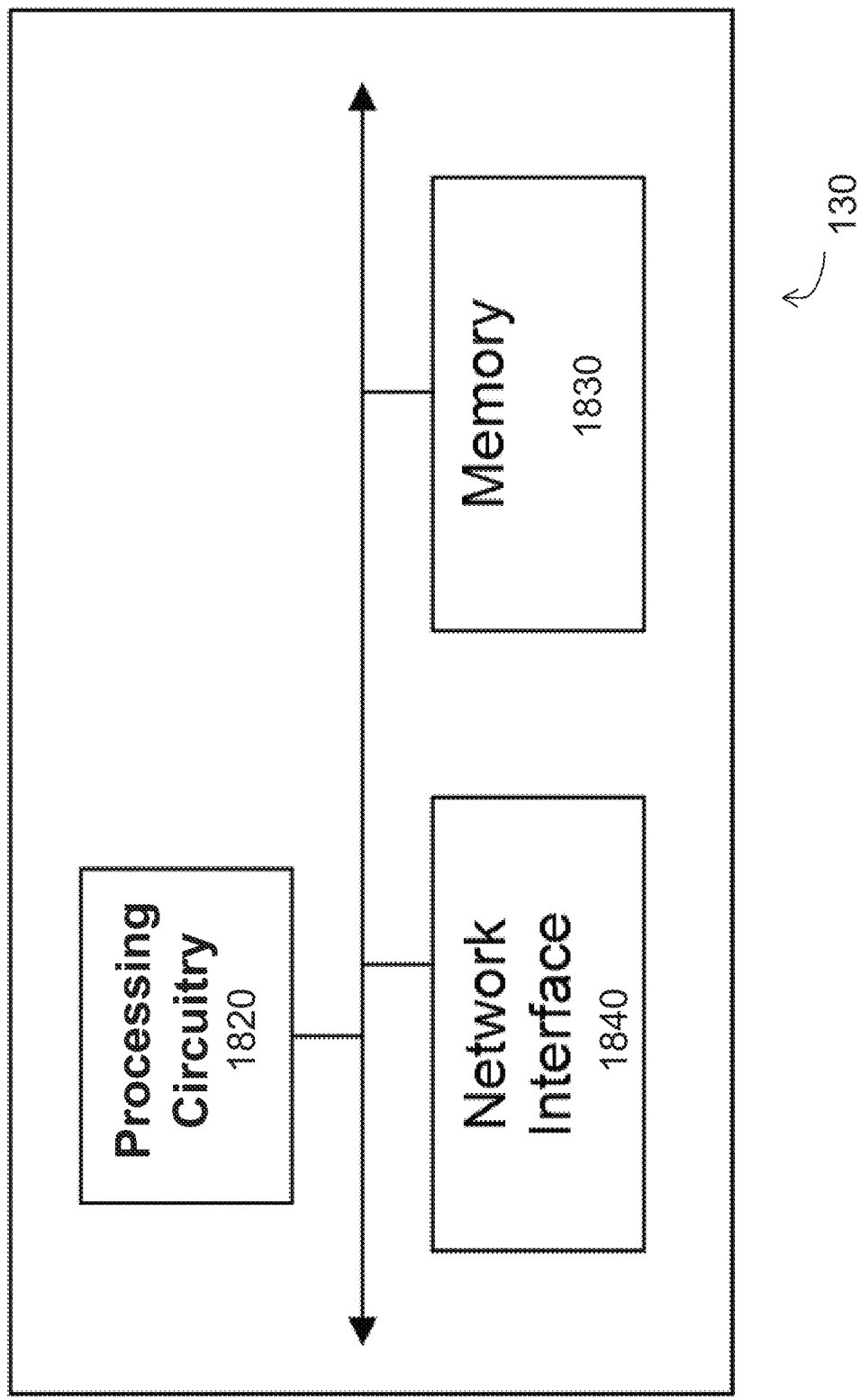
FIG. 18 is a block schematic of an exemplary radio network controller or core network node, in accordance with certain embodiments.

FIG. 18 is a block schematic of an exemplary radio network controller or core network node 130, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 130 includes processing circuitry 1820, memory 1830, and network interface 1840. In some embodiments, processing circuitry 1820 executes instructions to provide some or all of the functionality described above as being provided by the network node, memory 1830 stores the instructions executed by processing circuitry 1820, and network interface 1840 communicates signals to any suitable node, such as a gateway, switch, router, Internet, Public Switched Telephone Network (PSTN), network nodes 115, radio network controllers or core network nodes 130, etc.

Processing circuitry 1820 may include any suitable combination of hardware and software implemented in one or more modules to execute instructions and manipulate data to perform some or all of the described functions of the radio network controller or core network node 130. In some embodiments, processing circuitry 1820 may include, for example, one or more computers, one or more CPUs, one or more microprocessors, one or more applications, one or more ASICs, one or more FPGAs, and/or other logic.

Memory 1830 is generally operable to store instructions, such as a computer program, software, an application including one or more of logic, rules, algorithms, code, tables, etc. and/or other instructions capable of being executed by a processor. Examples of memory 1830 include computer memory (for example, RAM or ROM), mass storage media (for example, a hard disk), removable storage media (for example, a CD or a DVD), and/or or any other volatile or non-volatile, non-transitory computer-readable and/or computer-executable memory devices that store information.

In some embodiments, network interface 1840 is communicatively coupled to processing circuitry 1820 and may refer to any suitable device operable to receive input for the network node, send output from the network node, perform suitable processing of the input or output or both, communicate to other devices, or any combination of the preceding. Network interface 1840 may include appropriate hardware (e.g., port, modem, network interface card, etc.) and software, including protocol conversion and data processing capabilities, to communicate through a network.

Other embodiments of the network node may include additional components beyond those shown in FIG. 18 that may be responsible for providing certain aspects of the network node's functionality, including any of the functionality described above and/or any additional functionality (including any functionality necessary to support the solution described above).

FIG. 19 is a block schematic of an exemplary wireless device, in accordance with certain embodiments. Wireless device 110 may include one or more modules. For example, wireless device 110 may include a determining module 1910, a communication module 1920, a receiving module 1930, an input module 1940, a display module 1950, and any other suitable modules. In some embodiments, one or more of determining module 1910, communication module 1920, receiving module 1930, input module 1940, display module 1950, or any other suitable module may be implemented using one or more processors, such as processing circuitry 1620 described above in relation to FIG. 16. In certain embodiments, the functions of two or more of the various modules may be combined into a single module. In certain embodiments, wireless device 110 may include additional modules beyond those shown in the example of FIG. 19. In certain embodiments, wireless device 110 may not include all of the modules described herein with respect to FIG. 19. Wireless device 110 may perform the methods for flexibly defining a cell based on sets of signals described above with respect to FIGS. 1-15.

Determining module 1910 may perform the processing functions of wireless device 110. For example, determining module 1910 may obtain a configuration for measurement management associated to cell definitions based on multiple signals, the configuration defining a first cell based on a first set of signals. As another example, determining module 1910 may configure measurement management associated to cell definitions based on multiple signals according to the obtained configuration. As still another example, determining module 1910 may monitor one or more beams. As yet another example, determining module 1910 may perform one or more measurements on the first set of signals defining the first cell. As another example, determining module 1910 may generate a measurement value for the first cell based on the one or more measurements performed on the first set of signals defining the first cell. In certain embodiments, each of the one or more measurements performed on the first set of signals defining the first cell may be a per-beam measurement, and determining module 1910 may generate the measurement value for the first cell by combining a plurality of per-beam measurements into a per-cell measurement. As another example, determining module 1910 may evaluate one or more measurement report triggering conditions based on the one or more measurements performed on at least the first set of signals defining the first cell. As another example, determining module 1910 may determine a pre-defined configuration for measurement management associated to cell definitions based on multiple signals.

Determining module 1910 may include or be included in one or more processors, such as processing circuitry 1620 described above in relation to FIG. 16. Determining module 1910 may include analog and/or digital circuitry configured to perform any of the functions of determining module 1910 and/or processing circuitry 1820 described above. The functions of determining module 1910 described above may, in certain embodiments, be performed in one or more distinct modules.

Communication module 1920 may perform the transmission functions of wireless device 110. For example, communication module 1920 may send a measurement report to a network node when a measurement report triggering condition is met, the measurement report comprising information about the first cell. As another example, communication module 1920 may send capability information, the capability information indicating the capability of the wireless device for supporting measurement management associated to cell definitions based on multiple signals. As still another example, communication module 1920 may receive an indication of a link between a carrier frequency of the DL resources and a carrier frequency of the UL resources in system information transmitted on the DL resources. Communication module 1920 may transmit messages to one or more of network nodes 115 of network 100. Communication module 1920 may include a transmitter and/or a transceiver, such as transceiver 1610 described above in relation to FIG. 16. Communication module 1920 may include circuitry configured to wirelessly transmit messages and/or signals. In particular embodiments, communication module 1920 may receive messages and/or signals for transmission from determining module 1910. In certain embodiments, the functions of communication module 1920 described above may be performed in one or more distinct modules.

Receiving module 1930 may perform the receiving functions of wireless device 110. For example, receiving module 1930 may receive a configuration for measurement management associated to cell definitions based on multiple signals, the configuration defining a first cell based on a first set of signals. As another example, receiving module 1930 may receive a first search space index associated to a first search space. As another example, receiving module 1930 may receive a request for capability information associated to cell definitions based on multiple signals. Receiving module 1930 may include a receiver and/or a transceiver, such as transceiver 1610 described above in relation to FIG. 16. Receiving module 1930 may include circuitry configured to wirelessly receive messages and/or signals. In particular embodiments, receiving module 1930 may communicate received messages and/or signals to determining module 1910. The functions of receiving module 1930 described above may, in certain embodiments, be performed in one or more distinct modules.

Input module 1940 may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 1910. The functions of input module 1940 described above may, in certain embodiments, be performed in one or more distinct modules. Although the example of FIG. 19 illustrates wireless device 110 having an input module 1940, this is for purposes of example only. In certain embodiments, wireless device 110 may not include input module 1940.

Display module 1950 may present signals on a display of wireless device 110. Display module 1950 may include the display and/or any appropriate circuitry and hardware configured to present signals on the display. Display module 1950 may receive signals to present on the display from determining module 1910. The functions of display module 1950 described above may, in certain embodiments, be performed in one or more distinct modules. Although the example of FIG. 19 illustrates wireless device 110 having a display module 1950, this is for purposes of example only. In certain embodiments, wireless device 110 may not include display module 1940.

Determining module 1910, communication module 1920, receiving module 1930, input module 1940, and display module 1950 may include any suitable configuration of hardware and/or software. Wireless device 110 may include additional modules beyond those shown in FIG. 19 that may be responsible for providing any suitable functionality, including any of the functionality described above and/or any additional functionality (including any functionality necessary to support the various solutions described herein).

FIG. 20 is a block schematic of an exemplary network node 115, in accordance with certain embodiments. Network node 115 may include one or more modules. For example, network node 115 may include determining module 2010, communication module 2020, receiving module 2030, and any other suitable modules. In some embodiments, one or more of determining module 2010, communication module 2020, receiving module 2030, or any other suitable module may be implemented using one or more processors, such as processing circuitry 1720 described above in relation to FIG. 17. In certain embodiments, the functions of two or more of the various modules may be combined into a single module. In certain embodiments, network node 115 may include additional modules beyond those shown in the example of FIG. 20. In certain embodiments, network node 115 may not include all of the modules described herein with respect to FIG. 20. Network node 115 may perform the methods for flexibly defining a cell based on sets of signals described above with respect to FIGS. 1-15.

Determining module 2010 may perform the processing functions of network node 115. For example, determining module 2010 may determine a configuration for measurement management associated to cell definitions based on multiple signals, the configuration defining a first cell based on a first set of signals. As another example, determining module 2010 may configure a wireless device for measurement management associated to cell definitions based on multiple signals. As another example, determining module 2010 may evaluate handover decisions based on a received measurement report. As another example, determining module 2010 may obtain capability information for the wireless device. As another example, determining module 2010 may autonomously determine the capability information for the wireless device. Determining module 2010 may include or be included in one or more processors, such as processing circuitry 1720 described above in relation to FIG. 17. Determining module 2010 may include analog and/or digital circuitry configured to perform any of the functions of determining module 2010 and/or processing circuitry 1720 described above. The functions of determining module 2010 may, in certain embodiments, be performed in one or more distinct modules.

Communication module 2020 may perform the transmission functions of network node 115. For example, communication module 2020 may send information about the determined configuration to a wireless device. As another example, communication module 2020 may send information about the determined configuration as part of a measurement object. As still another example, communication module 2020 may send the configuration for measurement management associated to cell definitions based on multiple signals to the wireless device. As yet another example, communication module 2020 may send an indication of a predefined configuration to the wireless device. As still example, communication module 2020 may send, to the wireless device, a first search space index associated to a first search space. As another example, communication module 2020 may send a request for capability information associated to cell definitions based on multiple signals to the wireless device. As another example, communication module 2020 may send an indication of a link between a carrier frequency of the DL resources and a carrier frequency of the UL resources in system information transmitted on the DL resources. Communication module 2020 may transmit messages to one or more of wireless devices 110. Communication module 2020 may include a transmitter and/or a transceiver, such as transceiver 1710 described above in relation to FIG. 17. Communication module 2020 may include circuitry configured to wirelessly transmit messages and/or signals. In particular embodiments, communication module 2020 may receive messages and/or signals for transmission from determining module 2010 or any other module. The functions of communication module 2020 may, in certain embodiments, be performed in one or more distinct modules.

Receiving module 2030 may perform the receiving functions of network node 115. For example, receiving module 2030 may receive a measurement report from the wireless device, the measurement report comprising information about the first cell. As another example, receiving module 2030 may receive capability information from the wireless device or another network node. Receiving module 2030 may receive any suitable information from a wireless device. Receiving module 2030 may include a receiver and/or a transceiver, such as transceiver 1710 described above in relation to FIG. 17. Receiving module 2030 may include circuitry configured to wirelessly receive messages and/or signals. In particular embodiments, receiving module 2030 may communicate received messages and/or signals to determining module 2010 or any other suitable module. The functions of receiving module 2030 may, in certain embodiments, be performed in one or more distinct modules.

Determining module 2010, communication module 2020, and receiving module 2030 may include any suitable configuration of hardware and/or software. Network node 115 may include additional modules beyond those shown in FIG. 20 that may be responsible for providing any suitable functionality, including any of the functionality described above and/or any additional functionality (including any functionality necessary to support the various solutions described herein).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations Used in the Preceding Description Include:
3GPP 3$^{rd}$ Generation Partnership Project
AP Access Point
AMM Active Mode Mobility
ASIC Application Specific Integrated Circuit
BS Base Station
BSC Base Station Controller
BTS Base Transceiver Station
CD Compact Disk
CIO Cell Individual Offset
CPE Customer Premises Equipment
CPU Central Processing Unit
CRS Cell Specific Reference Signal
CSI Channel State Information
CSI-RS Channel State Information Reference Signal
D2D Device-to-device
DAS Distributed Antenna System
DCI Downlink Control Information
DL Downlink
DM Domain Manager
DMRS Demodulation Reference Signal
DVD Digital Video Disk
eNB evolved Node B
E-SMLC Evolved Serving Mobile Location Center
E-UTRA Evolved Universal Terrestrial Radio Access
E-UTRAN Evolved Universal Terrestrial Radio Access Network
FDD Frequency Division Duplex
FPGA Field Programmable Gate Array
HO Handover
IE Information Element
IoT Internet of Things
IP Internet Protocol
LAN Local Area Network
LEE Laptop Embedded Equipment
LME Laptop Mounted Equipment
LOS Line of Sight
LTE Long Term Evolution
M2M Machine-to-Machine
MAC Medium Access Control
MAN Metropolitan Area Network
MCE Multi-cell/multicast Coordination Entity
MCS Modulation level and coding scheme
MDT Minimization of Drive Test
MME Mobility Management Entity
MRS Mobility Reference Signal
MSC Mobile Switching Center
MSR Multi-standard Radio
MTC Machine-Type Communication
NAS Non-Access Stratum
NB-IoT Narrow band Internet of Things
NE Network Elements
NM Network Manager
NR New Radio
O&M Operations and Management
OSS Operations Support System
PBCH Physical Broadcast Channel
PSTN Public Switched Telephone Network
RACH Random Access Channel
RAM Random Access Memory
RAN Radio Access Network
RAT Radio Access Technology
RNC Radio Network Controller
ROM Read-Only Memory
RRC Radio Resource Control
RRH Remote Radio Head
RRU Remote Radio Unit
SON Self-Organizing Network
SS Synchronization Signal
SSB Synchronization Signal/Physical Broadcast Channel Block
TA Timing Advance
TDD Time Division Duplex
TR Transmission Resources
TRP Transmission/Reception Point
TT Time to Trigger
UCI Uplink Control Information
UE User Equipment
UL Uplink
WAN Wide Area Network
WLAN Wireless Local Area Network

The invention claimed is:
1. A method in a wireless device, comprising:
obtaining a configuration that defines, for measurement management, a first cell of a wireless communication network as a first set of signals of the first cell;
performing measurements on the first set of signals;
generating a per cell measurement value representative of a received-signal quality or strength for the first cell with respect to the wireless device, from the measurements made on the first set of signals;
evaluating the per cell measurement value of the first cell to determine whether a condition is met for sending a measurement report to the wireless communication network, the measurement report used by the wireless communication network for managing mobility of the wireless device within the wireless communication network; and
sending the measurement report responsive to the condition being met.

2. The method of claim 1, wherein the first set of signals comprises a plurality of beam reference signals, each beam reference signal conveyed in a different downlink transmission beam of the first cell, and wherein the measurements comprise per beam measurements made on the plurality of beam reference signals, and wherein the wireless device uses a combining operation to obtain the per cell measurement for the first cell, the combining operation being a maximum-value function that sets the per cell measurement value for the first cell as a maximum one among the per beam measurements, or sets the per cell measurement value for the first cell as the average of the per beam measurements.

3. The method of claim 1, wherein the configuration is part of a measurement object.

4. The method of claim 1, wherein the first set of signals is associated with a first search space.

5. The method of claim 4, wherein:
the configuration further defines, for measurement management, a second cell as a second set of signals of the second cell;
the second set of signals is associated with a second search space that is different than the first search space; and
wherein the method further includes determining a per cell measurement value for the second cell, based on the second set of signals, and wherein evaluating the per cell measurement value of the first cell comprises evaluating the per cell measurement values of the first and second cells.

6. The method of claim 4, wherein the first search space comprises at least one of:
a set of contiguous transmission resources; and
multiple transmission resources in both time and frequency.

7. The method of claim 4, wherein:
the first search space is associated with a first search space index; and
the method comprises receiving the first search space index associated with the first search space.

8. The method of claim 1, wherein generating the measurement value for the first cell comprises generating the measurement value based on a combination of the measurements made on the first set of signals.

9. The method of claim 1, further comprising:
receiving a request for capability information, the request coming from a network node of the wireless communication network and requesting an indication of whether the wireless device is capable of generating a per cell measurement value from measurements made on multiple signals of the cell;
sending the requested capability information to the wireless communication network; and
wherein obtaining the configuration comprises receiving information indicating the configuration from the network node.

10. A method in a network node of a wireless communication network, comprising:
determining that a wireless device is capable of determining per cell measurement values for cells of the wireless communication network, based on, for each cell, performing measurements on multiple signals of the cell, the per cell measurement values used for managing the mobility of the wireless device within the wireless communication network and each per cell measurement value representing a received-signal quality or strength for a corresponding cell with respect to the wireless device;
responsive to the determination, determining a configuration for measurement management, the configuration defining, for measurement management, a first cell of the wireless communication network as a first set of signals of the first cell;
sending information about the configuration to the wireless device; and
receiving a measurement report sent from the wireless device in dependence on the per cell measurement value determined by the wireless device for the first cell, based on measurements performed by the wireless device on the first set of signals.

11. The method of claim 10, wherein the first set of signals comprises a plurality of beam reference signals, each beam reference signal conveyed in a different downlink transmission beam of the first cell.

12. The method of claim 10, wherein sending information about the configuration to the wireless device comprises sending information about the configuration as part of a measurement object.

13. The method of claim 10, wherein the first set of signals is associated with a first search space.

14. The method of claim 13, wherein the configuration further defines for measurement management, a second cell as a second set of signals of the second cell, the second set of signals is associated with a second search space that is different than the first search space, to thereby configure the wireless device to determine the per cell measurement value for the first cell based on the first set of signals and determine the per cell measurement value for the second cell based on the second set of signals.

15. The method of claim 13, wherein the first search space comprises at least one of:
a set of contiguous transmission resources; and
multiple transmission resources in both time and frequency.

16. The method of claim 13, wherein:
the first search space is associated with a first search space index; and
the method further comprises sending, to the wireless device, the first search space index associated with the first search space.

17. The method of claim 10, wherein determining the capability of the wireless device comprises:
sending a request for capability information to the wireless device; and
receiving the capability information from the wireless device.

18. The method of claim 10, further comprising evaluating handover decisions based on the received measurement report.

19. A wireless device, comprising:
a receiver;
a transmitter; and processing circuitry coupled to the receiver and the transmitter, the processing circuitry configured to:
  obtain a configuration that defines, for measurement management, a first cell of a wireless communication network as a first set of signals of the first cell;
  perform measurements on the first set of signals;
  generate a per cell measurement value representative of a received-signal quality or strength for the first cell with respect to the wireless device, from the measurements made on the first set of signals;
  evaluate the per cell measurement value of the first cell to determine whether a condition is met for sending a measurement report to the wireless communication network, the measurement report used by the wireless communication network for managing mobility of the wireless device within the wireless communication network; and
  send the measurement report responsive to the condition being met.

20. The wireless device of claim 19, wherein the first set of signals comprises a plurality of beam reference signals, each beam reference signal conveyed in a different downlink transmission beam of the first cell, and wherein the measurements comprise per beam measurements made on the plurality of beam reference signals, and wherein the wireless device uses a combining operation to obtain the per cell measurement for the first cell, the combining operation being a maximum-value function that sets the per cell measurement value for the first cell as a maximum one among the per beam measurements, or sets the per cell measurement value for the first cell as the average of the per beam measurements.

21. The wireless device of claim 19, wherein the configuration is part of a measurement object.

22. The wireless device of claim 19, wherein the first set of signals is associated with a first search space.

23. The wireless device of claim 22, wherein:
  the configuration further defines, for measurement management, a second cell as a second set of signals of the second cell;
  the second set of signals is associated with a second search space that is different than the first search space; and
  wherein the processing circuitry is configured to determine a per cell measurement value for the second cell, based on the second set of signals, and wherein evaluating the per cell measurement value of the first cell comprises evaluating the per cell measurement values of the first and second cells.

24. The wireless device of claim 22, wherein the first search space comprises at least one of:
  a set of contiguous transmission resources; and
  multiple transmission resources in both time and frequency.

25. The wireless device of claim 22, wherein:
  the first search space is associated with a first search space index; and
  the processing circuitry is further configured to receive, via the receiver, the first search space index associated with the first search space.

26. The wireless device of claim 19, wherein the processing circuitry is further configured to generate the per cell measurement value for the first cell based on a combination of the measurements made on the first set of signals.

27. The wireless device of claim 19, wherein the processing circuitry is further configured to:
  receive, via the receiver, a request for capability information, the request coming from a network node of the wireless communication network and requesting an indication of whether the wireless device is capable of generating a per cell measurement value from measurements made on multiple signals of the cell; and
  send, via the transmitter, the requested capability information; and
  wherein the processing circuitry obtains the configuration by receiving information indicating the configuration from the network node.

28. A network node configured for operation in a wireless communication network, comprising:
  a receiver;
  a transmitter; and
  processing circuitry coupled to the receiver and the transmitter, the processing circuitry configured to:
    determine that a wireless device is capable of determining per cell measurement values for cells of the wireless communication network, based on, for each cell, performing measurements on multiple signals of the cell, the per cell measurement values used for managing the mobility of the wireless device within the wireless communication network and each per cell measurement value representing a received-signal quality or strength for a corresponding cell with respect to the wireless device;
    responsive to the determination, determine a configuration for measurement management, the configuration defining, for measurement management, a first cell of the wireless communication network as a first set of signals of the first cell;
    send, via the transmitter, information about the configuration to the wireless device; and
    receive, via the receiver, a measurement report sent from the wireless device in dependence on the per cell measurement value determined by the wireless device for the first cell, based on measurements performed by the wireless device on the first set of signals.

29. The network node of claim 28, wherein the first set of signals comprises a plurality of beam reference signals, each beam reference signal conveyed in a different downlink transmission beam of the first cell.

30. The network node of claim 28, wherein the processing circuitry is configured to send information about the configuration to the wireless device by sending information about the configuration as part of a measurement object.

31. The network node of claim 28, wherein the first set of signals is associated with a first search space.

32. The network node of claim 31, wherein the configuration further defines, for measurement management, a second cell as a second set of signals of the second cell, wherein the second set of signals is associated with a second search space that is different than the first search space, to thereby configure the wireless device to determine the per cell measurement value for the first cell based on the first set of signals and determine the per cell measurement value for the second cell based on the second set of signals where the second set of signals might be detected; and
  the second search space is different from the first search space.

33. The network node of claim 31, wherein the first search space comprises at least one of:
  a set of contiguous transmission resources; and
  multiple transmission resources in both time and frequency.

34. The network node of claim 31, wherein:
the first search space is associated with a first search space index; and
the processing circuitry is further configured to send, via the transmitter, to the wireless device, the first search space index associated with the first search space.

35. The network node of claim 28, wherein the processing circuitry is further configured to determine the capability of the wireless device by sending, via the transmitter, a request for capability information to the wireless device, and receiving, via the receiver, the capability information from the wireless device.

36. The network node of claim 28, wherein the processing circuitry is further configured to evaluate handover decisions based on the received measurement report.

* * * * *